(12) United States Patent
Arai

(10) Patent No.: US 10,355,628 B2
(45) Date of Patent: Jul. 16, 2019

(54) STARTING POWER GENERATION APPARATUS AND STARTING POWER GENERATION METHOD

(71) Applicant: SHINDENGEN ELECTRIC MANUFACTURING CO., LTD., Tokyo (JP)

(72) Inventor: Tatsuya Arai, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/758,085

(22) PCT Filed: Oct. 1, 2015

(86) PCT No.: PCT/JP2015/077936
§ 371 (c)(1),
(2) Date: Mar. 7, 2018

(87) PCT Pub. No.: WO2017/056289
PCT Pub. Date: Apr. 6, 2017

(65) Prior Publication Data
US 2018/0254724 A1  Sep. 6, 2018

(51) Int. Cl.
*H02P 9/00* (2006.01)
*F02N 11/04* (2006.01)
(Continued)

(52) U.S. Cl.
CPC .............. *H02P 9/009* (2013.01); *F02N 11/04* (2013.01); *H02P 9/08* (2013.01); *H02P 2101/25* (2015.01)

(58) Field of Classification Search
CPC ........ H02P 9/009; H02P 9/08; H02P 2101/25; F02N 11/04
See application file for complete search history.

(56) References Cited

U.S. PATENT DOCUMENTS 4,616,166 A * 10/1986 Cooper ................... B60L 11/06
                                                        290/31
5,493,200 A *  2/1996 Rozman ................... H02P 9/08
                                                        322/10
(Continued)

FOREIGN PATENT DOCUMENTS

EP      0 440 454         8/1991
EP      2 704 307 A1      3/2014
(Continued)

OTHER PUBLICATIONS

International Search Report for PCT/JP2015/077936, dated Oct. 27, 2015, 4 pages.
(Continued)

*Primary Examiner* — Sean Gugger
(74) *Attorney, Agent, or Firm* — Nixon & Vanderhye P.C.

(57) ABSTRACT

Provided are: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; a second power conversion unit including a plurality of second AC terminals connected to the second multi-phase winding, the second power conversion unit being configured to control a current to be input and output via the second AC terminals; and a control unit configured to detect a positional relationship between the field portion and the armature unit based on an output voltage of the second multi-phase winding, and control the first power conversion unit and the second power conversion unit in accordance with the detected positional relationship.

8 Claims, 32 Drawing Sheets

(51) Int. Cl.
*H02P 9/08* (2006.01)
*H02P 101/25* (2016.01)

(56) References Cited

U.S. PATENT DOCUMENTS

| | | | |
|---|---|---|---|
| 6,320,349 B1 * | 11/2001 | Kaneko | B60L 15/025 |
| | | | 318/700 |
| 7,239,103 B2 | 7/2007 | Ho | |
| 9,917,539 B1 * | 3/2018 | Omura | H02P 6/16 |
| 2001/0006292 A1 | 7/2001 | Inaba et al. | |
| 2008/0246426 A1 * | 10/2008 | Aoki | H02M 7/53873 |
| | | | 318/461 |
| 2011/0057591 A1 | 3/2011 | Tagome et al. | |
| 2011/0234135 A1 | 9/2011 | Kato et al. | |
| 2015/0280528 A1 * | 10/2015 | Collins | H02K 19/36 |
| | | | 310/68 B |
| 2018/0131302 A1 * | 5/2018 | Frampton | H02K 3/26 |

FOREIGN PATENT DOCUMENTS

| | | |
|---|---|---|
| JP | 3-230791 | 10/1991 |
| JP | 2003-083209 | 3/2003 |
| JP | 2011-205832 | 10/2011 |
| JP | 4801772 | 10/2011 |
| WO | WO 03/034573 A1 | 4/2003 |
| WO | WO 2009/144957 | 12/2009 |

OTHER PUBLICATIONS

Written Opinion of the ISA for PCT/JP2015/077936, dated Oct. 27, 2015, 4 pages.
International Preliminary Examination Report for PCT/JP2015/077936, dated Jul. 7, 2017, 19 pages.
Extended European Search Report dated Apr. 23, 2019 in European Application No. 15905443.6, 9 pages.

* cited by examiner

FIG. 7

| CONDUCTION PATTERN | | | | | | STAGE DETERMINATION |
|---|---|---|---|---|---|---|
| U1⇒V1 | V1⇒U1 | V1⇒W1 | W1⇒V1 | W1⇒U1 | U1⇒W1 | |
| INDUCED VOLTAGE | | | | | | |
| W2-N2 | | U2-N2 | | V2-N2 | | |
| SMALL + | LARGE − | SMALL − | SMALL + | LARGE − | SMALL + | 1 |
| SMALL + | LARGE + | LARGE + | SMALL + | SMALL − | SMALL + | 2 |
| SMALL + | SMALL − | LARGE − | SMALL + | SMALL + | LARGE − | 3 |
| LARGE + | SMALL − | SMALL − | SMALL + | SMALL − | LARGE + | 4 |
| LARGE − | SMALL − | SMALL − | LARGE − | SMALL + | SMALL − | 5 |
| SMALL + | SMALL − | SMALL − | LARGE + | LARGE + | SMALL − | 6 |

FIG. 22

| CONDUCTION PATTERN | | | | | | STAGE DETERMINATION |
|---|---|---|---|---|---|---|
| U1⇒V1 | V1⇒U1 | V1⇒W1 | W1⇒V1 | W1⇒U1 | U1⇒W1 | |
| INDUCED VOLTAGE | | | | | | |
| W1-N1 | | U1-N1 | | V1-N1 | | |
| SMALL + | LARGE − | SMALL − | SMALL + | LARGE − | SMALL + | 1 |
| SMALL + | LARGE + | LARGE + | SMALL + | SMALL − | SMALL + | 2 |
| SMALL + | SMALL − | LARGE − | SMALL + | SMALL + | LARGE − | 3 |
| LARGE + | SMALL − | SMALL − | SMALL + | SMALL − | LARGE + | 4 |
| LARGE − | SMALL − | SMALL − | LARGE − | SMALL + | SMALL − | 5 |
| SMALL + | SMALL − | SMALL − | LARGE + | LARGE + | SMALL − | 6 |

STARTING POWER GENERATION APPARATUS AND STARTING POWER GENERATION METHOD

This application is the U.S. national phase of International Application No. PCT/JP2015/077936 filed 1 Oct. 2015, which designated the U.S., the entire contents of which is hereby incorporated by reference.

TECHNICAL FIELD

The present invention relates to a starting power generation apparatus and a starting power generation method.

BACKGROUND ART

Conventionally, in vehicles, particularly in small two-wheeled vehicles and the like, ACG (AC generator) starter motors acting as starter motors at the start of engines and acting also as power generators after the start of the engines are often used (see, for example, Patent Document 1). Three-phase DC brushless motors are used for such ACG starter motors. For detection of a rotor position at the start of the engine and at the time of power generation of this three-phase DC brushless motor, a hall sensor has been provided for each winding of each phase of the three-phase winding, and thereby a rotor position has been detected using the hall sensor.

In the case where a hall sensor is used to detect a rotor position, however, when the hall sensor is arranged for the winding of each phase, it is necessary to arrange it for the purpose of accurately detecting the rotor position. For this reason, a high mounting accuracy is required for the positioning in arranging the hall sensor for the winding of each phase. Therefore, a working process of manufacturing the ACG starter motor becomes time-consuming by the work of mounting the hall sensor, thereby causing an increase in price of the three-phase DC brushless motor, such as the ACG starter motor described in Patent Document 1. Further, since the price of the hall sensor itself is high, the price of the ACG starter motor is increased.

In view of this, a technique of detecting a rotor position without using the hall sensor has been developed (see, for example, Patent Document 2). This Patent Document 2 discloses an example of a control device for a sensorless brushless motor. The control device described in Patent Document 2 detects a rotor position of the brushless motor by the following three methods. Firstly, when the brushless motor is stopped, a DC voltage with a plurality of patterns is conducted to two windings of the three-phase windings for a short period of time, and rising characteristics of current which varies in accordance with the rotor position are detected, thereby detecting the stop position of the rotor. Secondly, when the brushless motor is driven by a 120° conduction method, zero-cross points of the non-conduction phase are detected, thereby detecting the rotor position. Then, thirdly, when the brushless motor is driven by a 180° conduction method, the rotor position is detected based on a voltage induced in a sub coil attached to the winding of one phase.

CITATION LIST

Patent Document

[Patent Document 1] JP Application Publication No. 2003-83209

[Patent Document 2] JP Patent Publication No. 4801772

SUMMARY OF THE INVENTION

Problems to be Solved by the Invention

As described above, in the control device described in Patent Document 2, at the time of the 180° conduction, the rotor position is detected using the sub-coil attached for detection. Therefore, in the configuration described in Patent Document 2, there has been a problem that it is newly required to attach a sub-coil.

The present invention has an object to provide a starting power generation apparatus and a starting power generation method which can solve the above problem.

Means for Solving the Problems

To solve the above problem, a starting power generation apparatus according to one aspect of the present invention includes: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; a second power conversion unit including a plurality of second AC terminals connected to the second multi-phase winding, the second power conversion unit being configured to control a current to be input and output via the second AC terminals; and a control unit configured to detect a positional relationship between the field portion and the armature unit based on an output voltage of the second multi-phase winding, and control the first power conversion unit and the second power conversion unit in accordance with the positional relationship detected.

Additionally, in the starting power generation apparatus according to one aspect of the present invention, the control unit is configured to measure an induced voltage to be generated in the second multi-phase winding when a predetermined current is conducted to the first multi-phase winding, thereby detecting the positional relationship when the starter generator is stopped.

Further, in the starting power generation apparatus according to one aspect of the present invention, the control unit is configured to measure an induced voltage to be generated in the first multi-phase winding when a predetermined current is conducted to the first multi-phase winding, thereby detecting the positional relationship when the starter generator is stopped.

Moreover, in the starting power generation apparatus according to one aspect of the present invention, the control unit is configured to, in a case that the starter generator is driven as a power generator, set a conduction angle of the second power conversion unit to less than 180° and detect a zero-cross point of the output voltage of the second multi-phase winding, thereby detecting the positional relationship between the field portion and the armature unit.

Additionally, in the starting power generation apparatus according to one aspect of the present invention, the second power conversion unit includes a plurality of switching elements interposed between the first AC terminal and the second AC terminal.

Further, in the starting power generation apparatus according to one aspect of the present invention, the second power conversion unit further includes a plurality of switching elements interposed between the plurality of the second AC terminals and a ground.

Moreover, in the starting power generation apparatus according to one aspect of the present invention, the first power conversion unit includes a multi-phase bridge circuit configured to, between the first positive-side DC terminal and the plurality of the first AC terminals, convert a power bidirectionally between DC and AC, and a first switching element interposed between the first positive-side DC terminal and the battery; and the second power conversion unit includes a second positive-side DC terminal connected to the battery, a multi-phase bridge circuit configured to, between the second positive-side DC terminal and the plurality of the second AC terminals, convert a power bidirectionally between DC and AC, and a second switching element interposed between the second positive-side DC terminal and the battery.

Additionally, a starting power generation method according to one aspect of the present invention uses: a starter generator including a field portion having a permanent magnet, and an armature unit including a first multi-phase winding and a second multi-phase winding which are arranged in parallel; a first power conversion unit including a first positive-side DC terminal connected to a battery and a plurality of first AC terminals connected to the first multi-phase winding, the first power conversion unit being configured to convert a power bidirectionally between DC and AC; and a second power conversion unit including a plurality of second AC terminals connected to the second multi-phase winding, the second power conversion unit being configured to control a current to be input and output via the second AC terminals. The starting power generation method includes: detecting, by a control unit, a positional relationship between the field portion and the armature unit based on an output voltage of the second multi-phase winding; and controlling, by the control unit, the first power conversion unit and the second power conversion unit in accordance with the detected positional relationship.

Effects of the Invention

According to the present invention, it is possible to inexpensively detect the rotor position by a simple method without using an expensive sensor and a sub-coil.

BRIEF DESCRIPTION OF THE DRAWINGS

FIG. 7 is a schematic view for illustrating the stage determination process (S12) shown in FIG. 4.

FIG. 22 is a chart for illustrating the stage determination process in the fourth embodiment.

MODE FOR CARRYING OUT THE INVENTION

Figure 1:
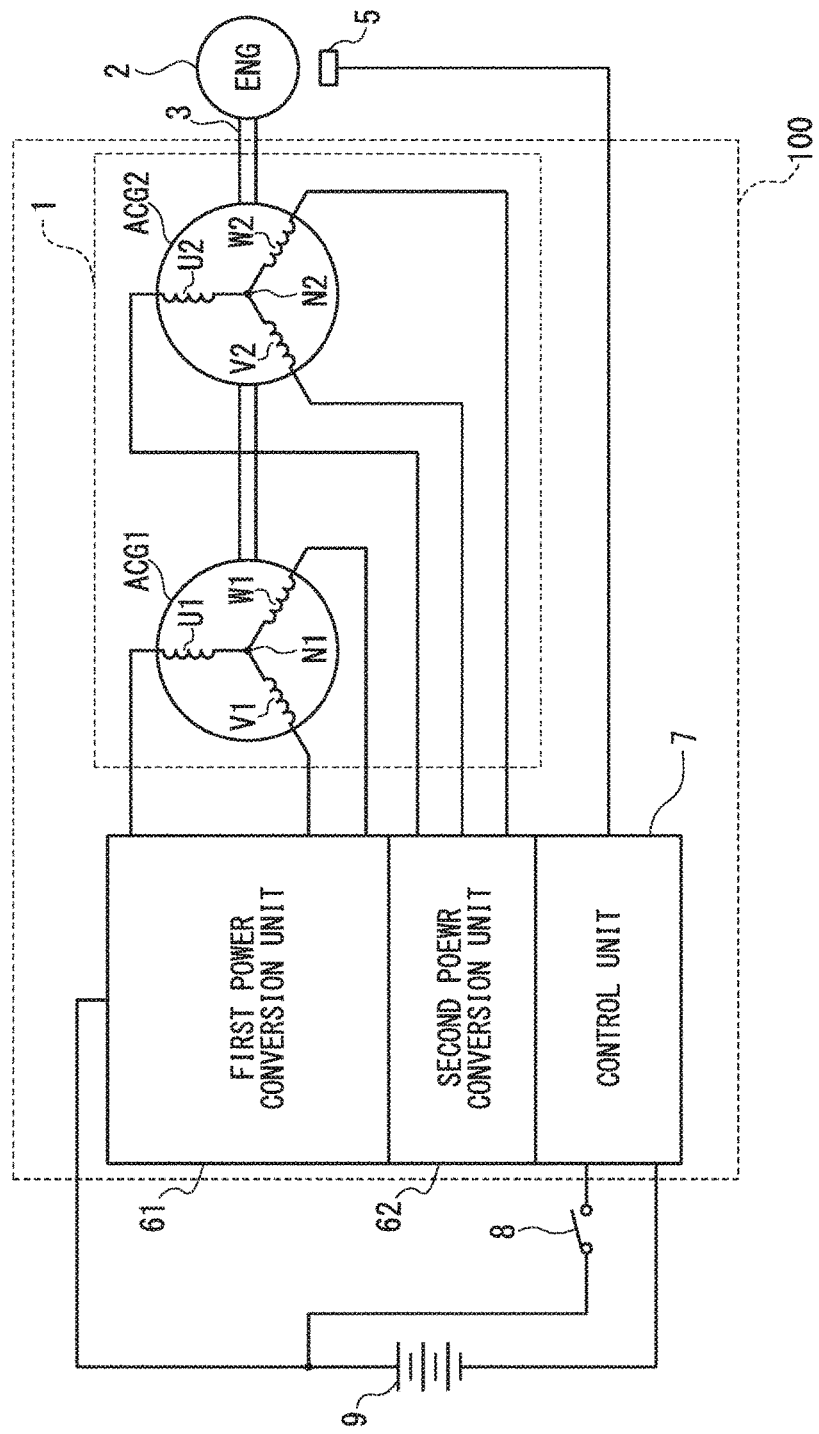
FIG. 1 is a block diagram showing a configuration example of an embodiment of the present invention.

Hereinafter, embodiments of the present invention will be described with reference to the accompanying drawings. FIG. 1 is a block diagram showing a configuration example of a starting power generation control apparatus 100 of the embodiment of the present invention. The starting power generation control apparatus 100 shown in FIG. 1 includes a starter generator (ACG starter motor) 1, a first power conversion unit 61, a second power conversion unit 62, and a control unit 7. The starter generator 1 is connected directly to a crank shaft 3 and rotates in synchronization with rotation of an engine 2. The first power conversion unit 61, the second power conversion unit 62, and the control unit 7 are connected with a positive electrode of the battery 9 and are grounded. The battery 9 is a secondary battery with a negative electrode grounded. Additionally, one end of a starter switch 8 is connected to the positive electrode of the battery 9, while the other end of the starter switch 8 is connected to the control unit 7. The starter switch 8 is a switch operated by the user at the start of the engine 2. Additionally, the control unit 7 is connected with an output of an engine water temperature gauge 5.

Under control of the first power conversion unit 61 and the second power conversion unit 62, the starter generator 1 operates as a starter motor or operates as a power generator. The starter generator 1 includes a winding portion ACG1, a winding portion ACG2, and a field portion 15 shown in FIG. 2. The winding portion ACG1 includes windings U1, V1 and W1 which constitute a star-connected three-phase winding (multi-phase winding). The winding portion ACG2 includes windings U2, V2, and W2 which constitute a star-connected three-phase winding. A neutral point N1 is a neutral point of the star connection constituting the winding portion ACG1. A neutral point N2 is a neutral point of the star connection constituting the winding portion ACG2. A set of windings U1, V1, and W1, and a set of the windings U2, V2, and W2, are wound around the same armature core (not shown), and are electrically insulated from each other. Here, the winding portion ACG1, the winding portion ACG2, and the armature core (not shown) constitute an armature unit. Here, the configurations of the winding portion ACG1 and the winding portion ACG2 are not limited to the star connections, and may be delta connections.

Figure 2:
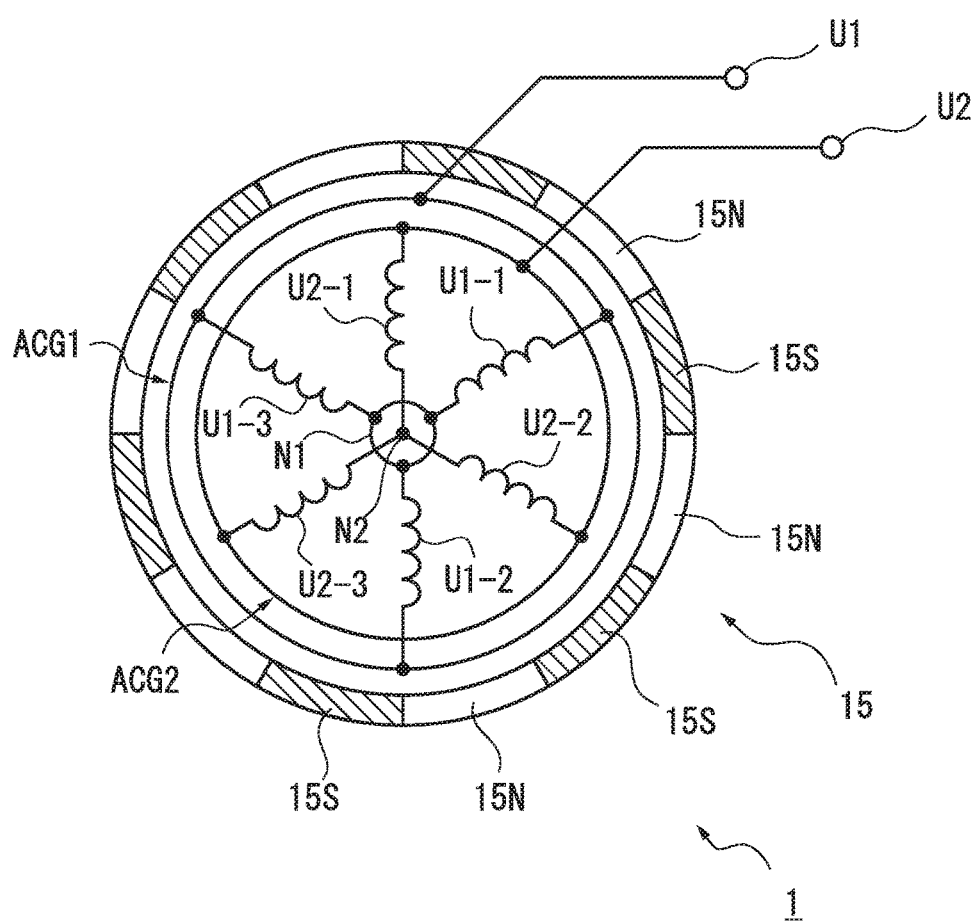
FIG. 2 is a view showing a configuration example of a starter generator 1 shown in FIG. 1.

FIG. 2 is a schematic view, viewed from an axial direction, showing a configuration example of the winding portion ACG1, the winding portion ACG2, and the field portion 15 of the starter generator 1. Here, FIG. 2 shows only the winding U1 and winding U2. In the configuration example shown in FIG. 2, the starter generator 1 is a brushless motor of outer rotor type in which the field portion 15 includes the plural sets of N-pole permanent magnets 15N and S-pole permanent magnets 15S. Hereinafter, the field portion 15 is also referred to as a rotor. The winding U1 includes three windings U1-1, U1-2, and U1-3 which are arranged every 120 degrees with respect to the armature core (not shown). One ends of the three windings U1-1, U1-2, and U1-3 of the winding U1 are connected in common to the neutral point N1, while the other ends thereof are connected in common to an input and output terminal of the winding U1. The winding U2 includes three windings U2-1, U2-2, and U2-3 which are arranged every 120 degrees with respect to the armature core (not shown) and are shifted by 60 degrees from the respective windings U1-1, U1-2, and U1-3. One ends of the three windings U2-1, U2-2, and U2-3 of the winding U2 are connected in common to the neutral point N2, while the other ends thereof are connected in common to an input and output terminal of the winding U2. Here, in the following description, when the appellation of the winding U1 or winding U2 is used as a connection destination of a circuit, it indicates the input and output terminal of the winding U1 or the winding U2, which is the terminal opposite to the neutral point N1 or the neutral point N2. The same applies to the winding V1, the winding W1, the winding V2, and the winding W2.

Here, in FIG. 1, the engine 2 is a power generator mounted on, for example, a small two-wheeled vehicle. The crankshaft 3 is a component of the engine 2, which is a shaft for converting into a rotational motion, a reciprocating motion of a piston (not shown) included in the engine 2. The engine water temperature gauge 5 is a sensor for detecting the temperature of a coolant of the engine 2.

Figure 3:
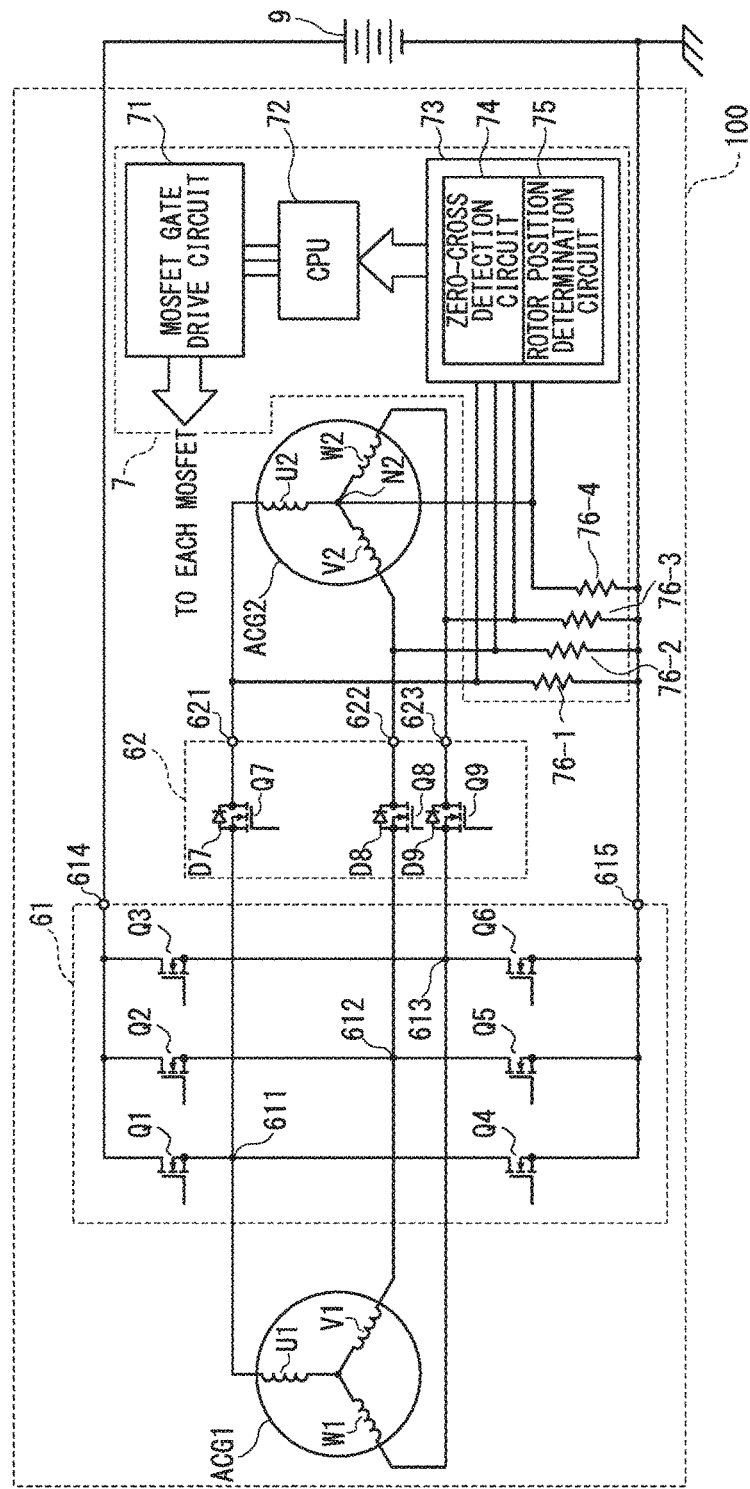
FIG. 3 is a circuit diagram for illustrating internal configurations of a first power conversion unit 61, a second power conversion unit 62, and a control unit 7, which are shown in FIG. 1.

Next, an example of internal configurations of the first power conversion unit 61, the second power conversion unit 62, and the control unit 7, which are shown in FIG. 1, will be described with reference to FIG. 3. As shown in FIG. 3, the first power conversion unit 61 includes six n-channel MOSFETs (metal oxide semiconductor field effect transistors, hereinafter referred to as MOSFETs (switching elements)) (Q1) to (Q6), which constitute a 3-phase bridge orthogonal transform circuit (multiphase bridge circuit). In the first power conversion unit 61, a positive-side (high side) DC terminal 614 (first positive-side DC terminal) of an input-output line is connected to the positive electrode of the battery 9, while a negative-side (low side) DC terminal 615 is connected to the negative electrode of the battery 9. The first power conversion unit 61 performs bidirectional power conversion between AC and DC, between the battery 9 and the winding portion ACG1, or, between the battery 9 and the winding portions ACG1 and ACG2. In addition, AC terminals (first AC terminals) 611, 612, and 613 of the first power conversion unit 61 are connected respectively to the winding U1, V1, and W1 of the winding portion ACG1.

The second power conversion unit 62 includes three AC terminals (second AC terminals) 621, 622, and 623, and three MOSFETs (Q7), (Q8), and (Q9). The AC terminal 621 is connected to the winding U2 of the winding portion ACG2 and a drain of the MOSFET (Q7). The AC terminal 622 is connected to the winding V2 of the winding portion ACG2 and a drain of the MOSFET (Q8). The AC terminal 623 is connected to the winding W2 of the winding portion ACG2 and a drain of the MOSFET (Q9). A source of the MOSFET (Q7) is connected to the AC terminal 611 of the first power conversion unit 61. A source of the MOSFET (Q8) is connected to the AC terminal 612 of the first power conversion unit 61. A source of the MOSFET (Q9) is connected to the AC terminal 613 of the first power conversion unit 61. The second power conversion unit 62 turns on or off the MOSFETs (Q7), (Q8), and (Q9), thereby controlling a current to be input and output via the AC terminals 621, 622, and 623. In this case, the second power conversion unit 62 turns on or off the MOSFETs (Q7), (Q8), and (Q9), thereby connecting or disconnecting the windings U2, V2, and W2 of the winding portion ACG2 respectively to or from the AC terminals 611, 612, and 613 of the first power conversion unit 61.

Additionally, in this case, the three MOSFETs (Q7), (Q8), and (Q9) are interposed between the respective AC terminals 611, 612, and 613 of the first power conversion unit 61 connected with the respective windings U1, V1, and W1 of the winding portion ACG1 and the respective windings U2, V2, and W2 of the winding portion ACG2. Further, the three MOSFETs (Q7), (Q8), and (Q9) turn on or off the respective windings U2, V2, and W2 of the winding portion ACG2, thereby connecting or disconnecting the respective windings U2, V2, and W2 to or from the respective AC terminals 611, 612, and 613.

Additionally, in the respective MOSFETs (Q7), (Q8), and (Q9), parasitic diodes D7, D8, and D9 are formed between the drains and the sources (here, parasitic diodes for other MOSFETs are not shown). The directions of the parasitic diodes D7, D8, and D9 are the same with respect to the respective AC terminals 611, 612, and 613. In this case, anodes are connected to the AC terminals 611, 612, and 613. Additionally, cathodes are connected to the windings U2, V2, and W2 of the winding portion ACG2. By thus aligning the directions of the parasitic diodes D7, D8, and D9, it is possible to, when the respective MOSFETs (Q7), (Q8), and (Q9) are turned off, block an inflow of current from the battery 9 to the winding portion ACG2 via the first power conversion unit 61 in the motor operation and block an outflow of current from the winding portion ACG2 to the battery 9 via the first power conversion unit 61 in the power generating operation. Here, the directions of the parasitic diodes D7, D8, and D9 (i.e., directions of the drains and sources of the MOSFETs (Q7), (Q8), and (Q9)) may be opposite to those shown.

The control unit 7 includes a MOSFET gate drive circuit 71, a CPU (central processing unit) 72, a detection and determination circuit 73, and resistors 76-1 to 76-4. Here, in addition, the control unit 7 can perform ignition control of the engine 2, and the like, by connecting the input and output between sensors, actuators, and the like. The detection and determination circuit 73 includes a zero-cross detection circuit 74 and a rotor position determination circuit 75.

One end of the resistor 76-1 is connected to the winding U2, while the other end thereof is grounded. One end of the resistor 76-2 is connected to the winding V2, while the other end thereof is grounded. One end of the resistor 76-3 is connected to the winding W2, while the other end is grounded. Additionally, one end of the resistor 76-4 is connected to the neutral point N2, while the other end is grounded. Terminal voltages of the resistors 76-1 to 76-4 are input to the detection and determination circuit 73.

The zero-cross detection circuit 74 detects zero-cross points of induced voltages generated in the windings U2, V2, and W2. When a zero-cross point is detected, the zero-cross detection circuit 74 generates a stage signal indicating in which predetermined stage the rotor position is present and outputs the generated signal to the CPU 72.

At the time the starter generator 1 is stopped, the rotor position determination circuit 75 determines in which predetermined stage the rotor position is present in the following manner and outputs a result of the determination to the CPU 72. Here, the time the starter generator 1 is stopped means the time the engine 2 is stopped. Additionally, the rotor position means a relative position among the field portion 15, the winding portion ACG1, and winding portion ACG2. The determination by the rotor position determination circuit 75 is performed in a state where the winding portion ACG2 is electrically released by the second power conversion unit 62. The rotor position determination circuit 75 determines a rotor stage based on information (amount, polarity) regarding a voltage induced in the other winding portion ACG2 when a short pulse to the extent that the motor will not move is sequentially conducted, using the first power conversion unit 61, to the winding portion ACG1 according to predetermined conduction patterns.

Based on an output of the zero-cross detection circuit 74, an output of the rotor position determination circuit 75, or the like, the CPU 72 generates a control signal for turning on or off the MOSFETs (Q1) to (Q9) and outputs the generated control signal to the MOSFET gate drive circuit 71.

In response to the control signal input by the CPU 72, the MOSFET gate drive circuit 71 generates gate signals of the respective MOSFETs (Q1) to (Q9) and supplies the generated gate signals to the respective gates of the MOSFETs (Q1) to (Q9).

Next, an operation example of the starting power generation control apparatus 100 described with reference to FIGS. 1 to 3 will be described with reference to FIGS. 4 to 16. First, a case where the starter generator 1 is operated as a starter motor that performs starting of the engine 2 will be described with reference to FIGS. 4 to 14. Then, a case where the starter generator 1 is operated as a power generator will be described with reference to FIGS. 15 and 16.

Figure 4:
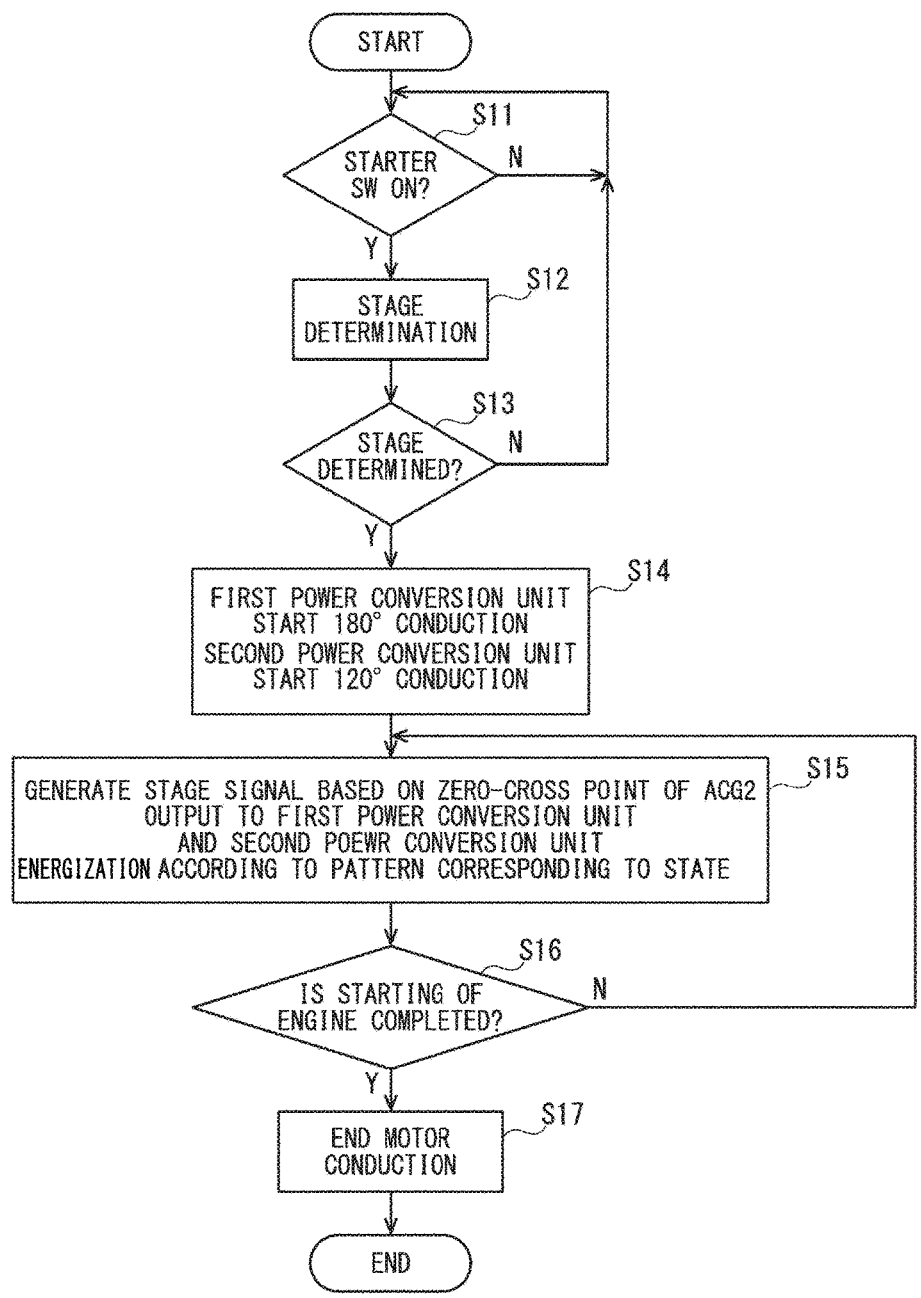
FIG. 4 is a flowchart showing an example of a starter motor starting control of a starting power generation apparatus 100 shown in FIG. 1.

FIG. 4 is a flowchart showing an example of starter motor starting control by the starting power generation apparatus 100 shown in FIG. 1. When an ignition switch (not shown) is turned on by the user in a state where the engine 2 is stopped, the power is supplied from the battery 9 to the control unit 7. Then, the CPU 72 performs a predetermined initial processing, and then starts the processing shown in FIG. 4. First, the CPU 72 waits until the starter switch 8 is turned on (repetition of "N" in step S11). When the user turns on the starter switch 8, the CPU 72 performs the stage determination process ("Y" in step S11 to step S12).

In step S12, the CPU 72 first turns off the MOSFETs (Q7) to (Q9) of the second power conversion unit 62, so as to electrically separate the winding portion ACG1 and the winding portion ACG2. Then, the CPU 72 controls the MOSFETs (Q1) to (Q6) of the first power conversion unit 61 to be turned on or off, thereby sequentially conducting a short pulse to the extent that the motor will not move, to the winding portion ACG1 according to a plurality of predetermined conduction patterns. On the other hand, the rotor position determination circuit 75 determines a rotor stage by comparing the voltage induced in the winding portion ACG2 among multiple conduction patterns.

Figure 5:
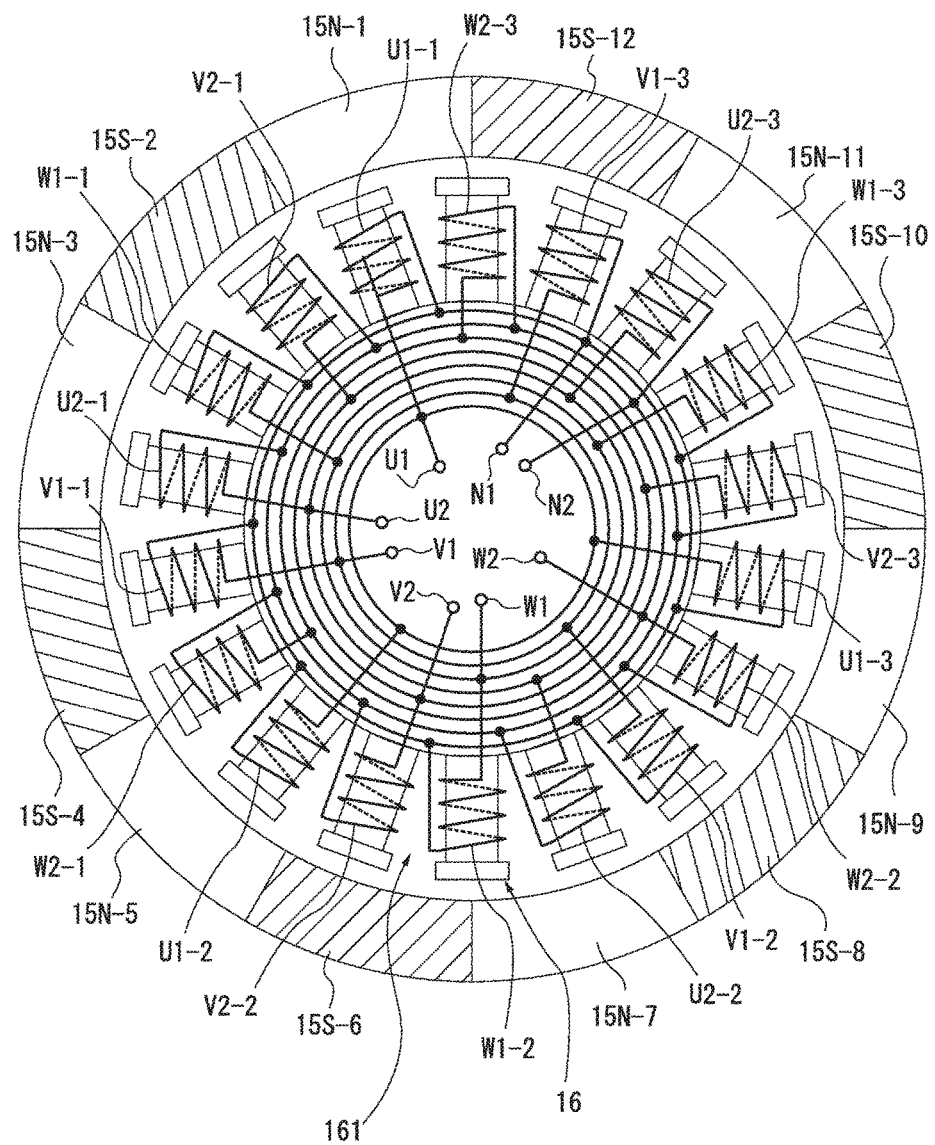
FIG. 5 is a schematic view for illustrating a stage determination process (S12) shown in FIG. 4.

Here, an example of the stage determination process in step S12 will be described with reference to FIGS. 5 to 13. FIG. 5 is a schematic diagram showing a configuration example of the field portion 15 of the starter generator 1 and the armature core 161 including the armature core 16, the winding portion ACG1, and the winding portion ACG2. In this case, the windings U1, V1, and W1 constituting the winding portion ACG1 respectively include the winding U1-1 to U1-3, the windings V1-1 to V1-3, and the winding W1-1 to W1-3. The windings U2, V2, and W2 constituting the winding portion ACG2 respectively include the winding U2-1 to U2-3, the windings V2-1 to V2-3, and the winding W2-1 to W2-3. In the configuration example shown in FIG. 5, the number of poles of the field portion 15 is 12. The field portion 15 includes N-pole permanent magnets 15N-1, 3, 5, 7, 9, and 11 and S-pole permanent magnets 15S-2, 4, 6, 8, 10, and 12 where the respective poles are alternately arranged. The number of slots of the armature core 16 is 18. One of the windings U1-1 to U1-3, windings V1-1 to V1-3, and the windings W1-1 to W1-3, and one of the windings U2-1 to U2-3, the windings V2-1 to V2-3, and the windings W2-1 to W2-3, are wound alternately around each slot.

Figure 6:
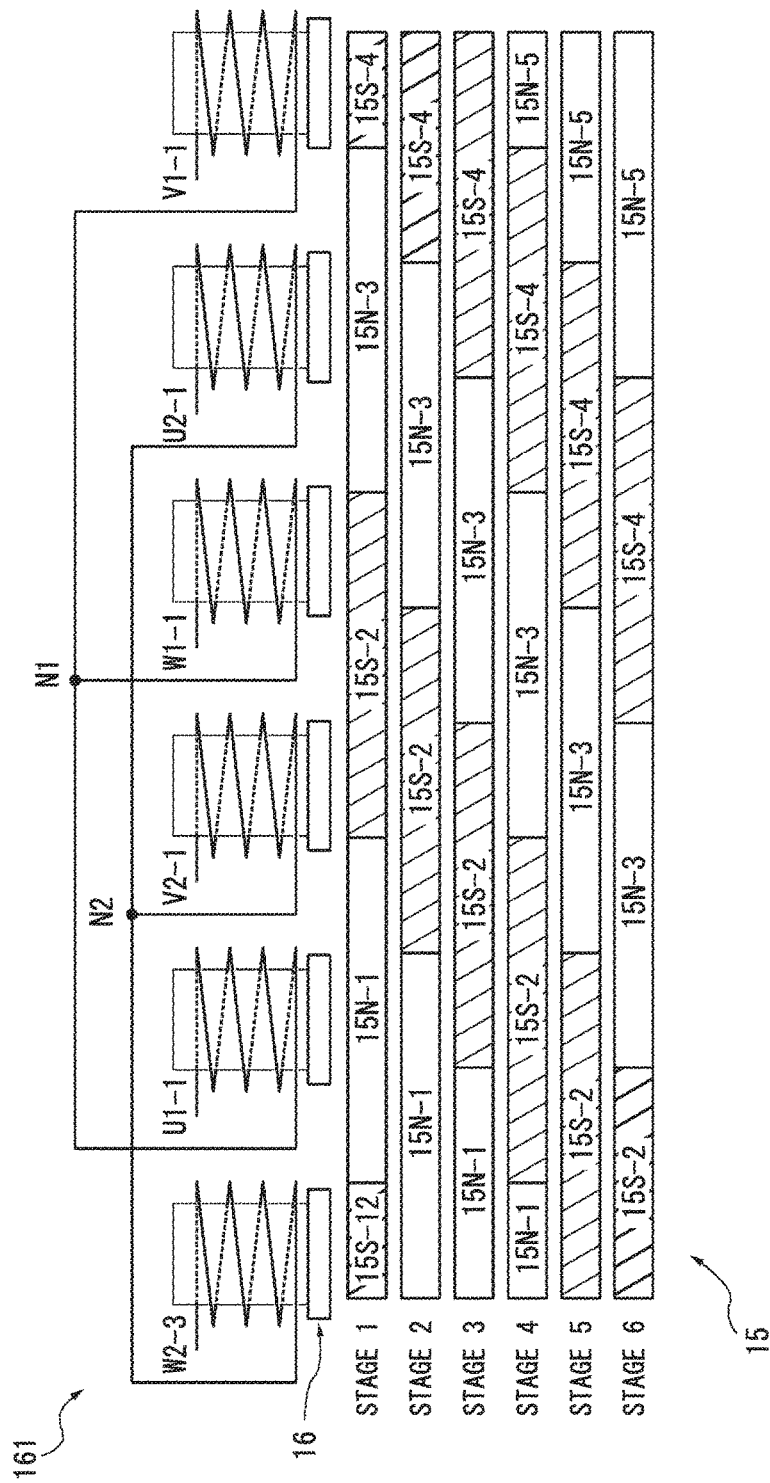
FIG. 6 is a schematic view for illustrating the stage determination process (S12) shown in FIG. 4.

FIG. 6 schematically shows a rotor position relationship among six stages in combination with the field portion 15 and the armature unit 161 shown in FIG. 5. Each stage differs in electrical angle by 60°.

FIG. 7 shows a correspondence relationship among a current pattern, an induced voltage, and a stage determination result. A conduction pattern "U1⇒V1" is a pattern where the MOSFETs (Q1) to (Q5) are turned on while the MOSFETs (Q7) to (Q9) are turned off, and conduction is made from the winding U1 to the winding V1. In the following conduction pattern, the MOSFETs (Q7) to (Q9) are all turned off. A conduction pattern "V1⇒U1" is a pattern where the MOSFETs (Q2) and (Q4) are turned on, and conduction is made from the winding V1 to the winding U1. A conduction pattern "V1⇒W1" is a pattern where the MOSFETs (Q2) and (Q6) are turned on, and conduction is made from the winding V1 to the winding W1. A conduction pattern "W1⇒V1" is a pattern where the MOSFETs (Q3) and (Q5) are turned on, and conduction is made from the winding W1 to the winding V1. A conduction pattern "W1⇒U1" is a pattern where the MOSFETs (Q3) and (Q4) are turned on, and conduction is made from the winding W1 to the winding U1. Additionally, a conduction pattern "U1⇒W1" is a pattern where the MOSFETs (Q1) and (Q6) are turned on, and conduction is made from the winding U1 to the winding W1.

An induced voltage "W2–N2" is a voltage of the winding W2 relative to the neutral point N2. An induced voltage "U2–N2" is a voltage of the winding U2 relative to the neutral point N2. Additionally, an induced voltage "V2–N2" is a voltage of the winding V2 relative to the neutral point N2. In step S12, the rotor position determination circuit 75 sequentially measures the voltage "W2–N2" in the case of the conduction pattern "U1⇒V1" and the conduction pattern "V1⇒U1," the voltage "U2–N2" in the case of the conduction pattern "V1⇒W1" and the conduction pattern "W1⇒V1," and the voltage "V2–N2" in the case of the conduction pattern "W1⇒U1" and the conduction pattern "U1⇒W1." Then, the rotor position determination circuit 75 determines a stage based on results of measuring the induced voltages in the respective conduction patterns. For example, the rotor position determination circuit 75 can determine a stage based on a result of comparison between the induced voltage and the positive and negative reference voltage. In the example of FIG. 7, for example, when both the voltage "W2–N2" in the case of the conduction pattern "V1⇒U1" and the voltage "V2–N2" in the case of the conduction pattern "W1⇒U1" have the negative polarity, and absolute values thereof are greater than the reference voltage, the rotor position determination circuit 75 can determine to be the stage 1, the positional relationship between the field portion 15 and the armature unit 161.

Next, how the induced voltages are generated in the stage 3, the stage 4, and the stage 6 will be described with reference to FIGS. 8 to 10.

Figure 8:
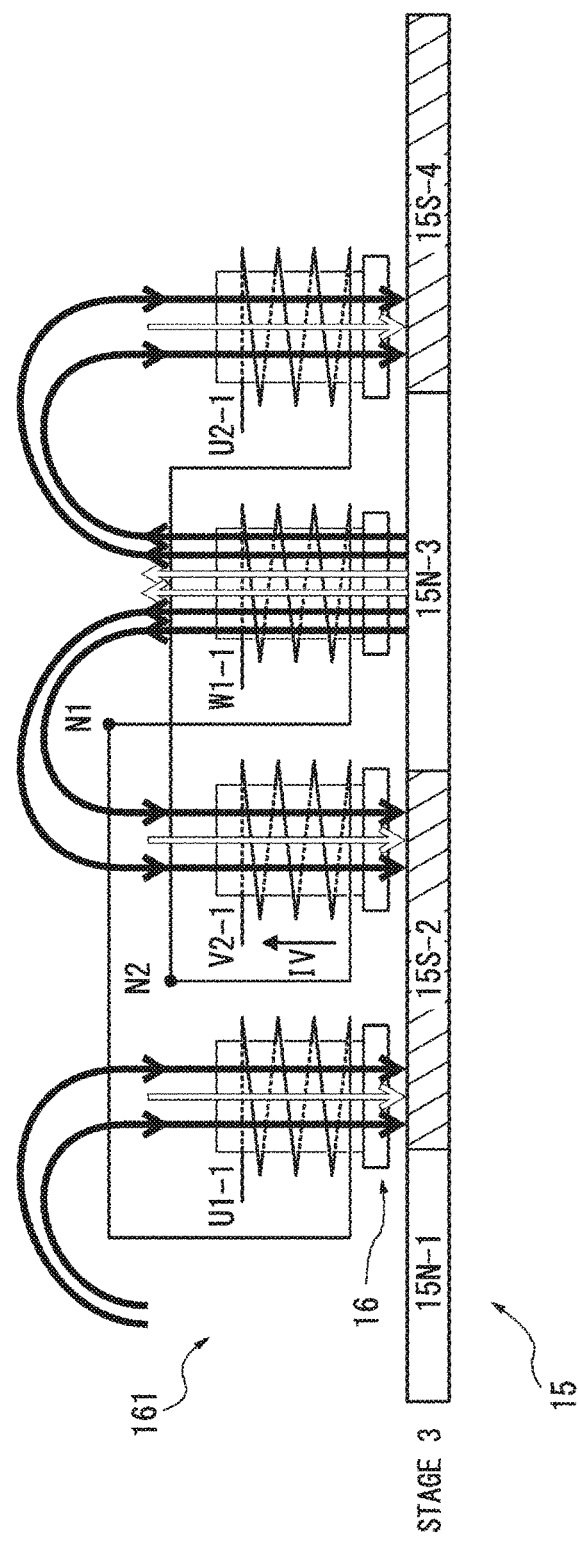
FIG. 8 is a schematic view for illustrating the stage determination process (S12) shown in FIG. 4.

FIG. 8 shows by arrows magnetic fluxes to be generated in the stage 3. The magnetic fluxes before conduction have a distribution indicated by the hollow arrows. In the case of conduction U1→N1→W1, the magnetic pole of U1 facing the magnet 15S-2 is magnetized to be the N-pole, while the magnetic pole of W1 facing the magnet 15N-3 is magnetized to be the S-pole, so as to become in the same direction as magnet field lines by the magnets. Thereby, magnetic fluxes (black arrows) crossing each winding increase, and the magnetic flux of the floating winding V2 increases by one, so that an induced voltage IV is generated in the direction from N2 to V2.

Figure 9:
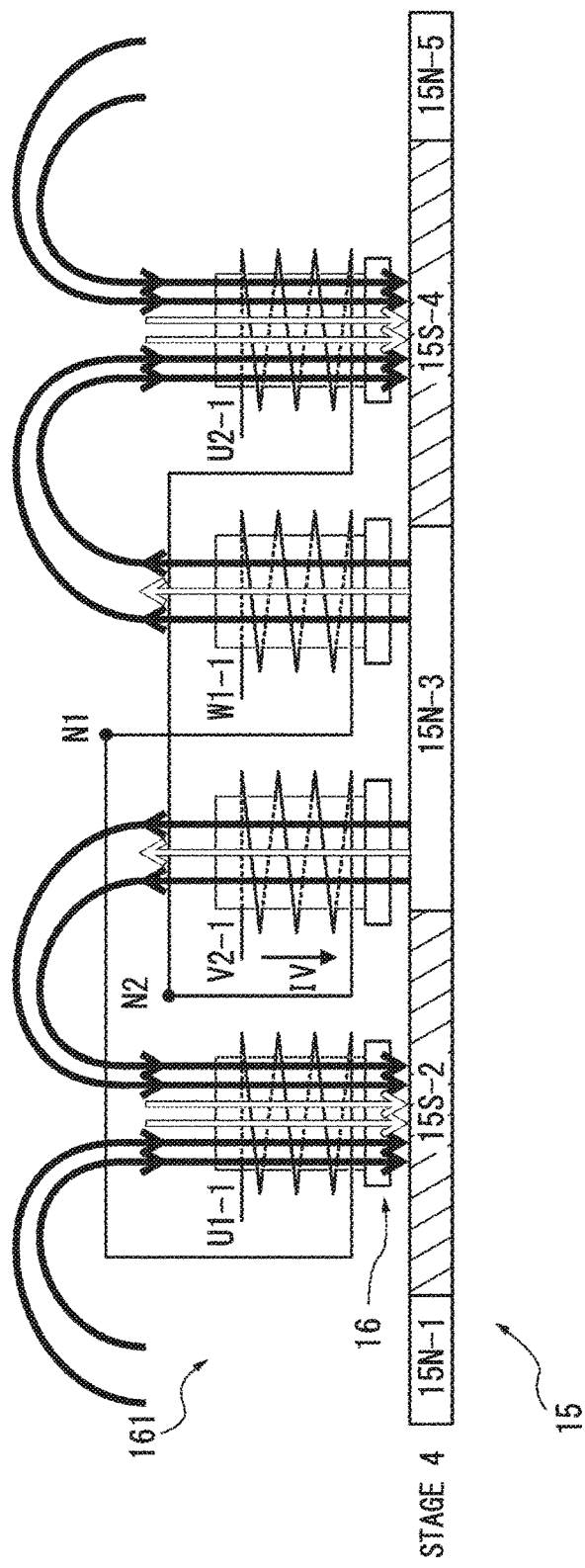
FIG. 9 is a schematic view for illustrating the stage determination process (S12) shown in FIG. 4.

FIG. 9 shows by arrows magnetic fluxes to be generated in the stage 4. The magnetic fluxes before conduction have a distribution indicated by the hollow arrows. In the case of conduction U1→N1→W1, the magnetic pole of U1 facing the magnet 15S-2 is magnetized to be the N-pole, while the magnetic pole of W1 facing the magnet 15N-3 is magnetized to be the S-pole, so as to become in the same direction as magnetic field lines by the magnets. Thereby, magnetic fluxes (black arrows) crossing each winding increase, and the magnetic flux of the floating winding V2 increases by one, so that an induced voltage IV is generated in the direction from V2 to N2.

Figure 10:
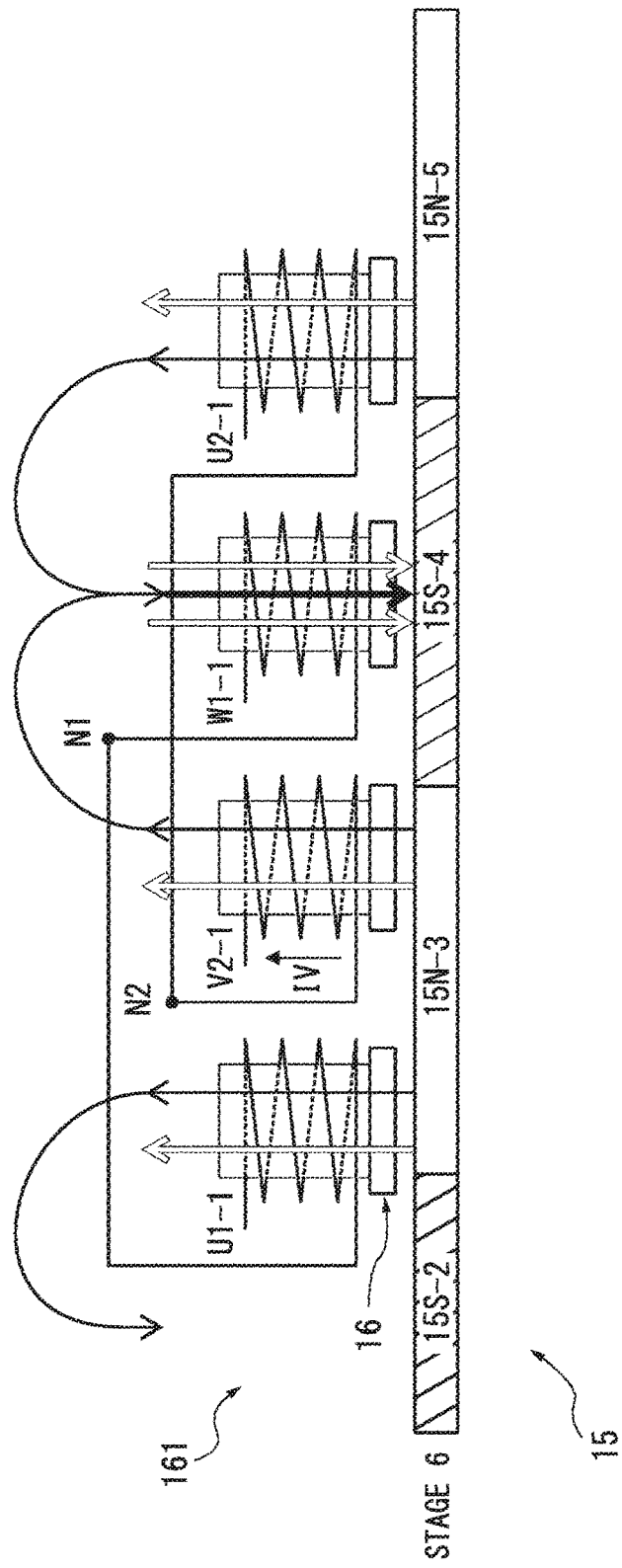
FIG. 10 is a schematic view for illustrating the stage determination process (S12) shown in FIG. 4.

FIG. 10 shows by arrows magnetic fluxes to be generated in the stage 6. The magnetic fluxes before conduction have a distribution indicated by the hollow arrows. In the case of conduction U1→N1→W1, the magnetic pole of U1 facing the magnet 15N-3 is magnetized to be the N-pole, while the magnetic pole of W1 facing the magnet 15S-4 is magnetized to be the S-pole, so as to become in the opposite direction as magnetic field lines by the magnets. Thereby, magnetic fluxes crossing the floating winding V2 only decreases to 0.5 line, so that an induced voltage IV is small.

Figure 11:
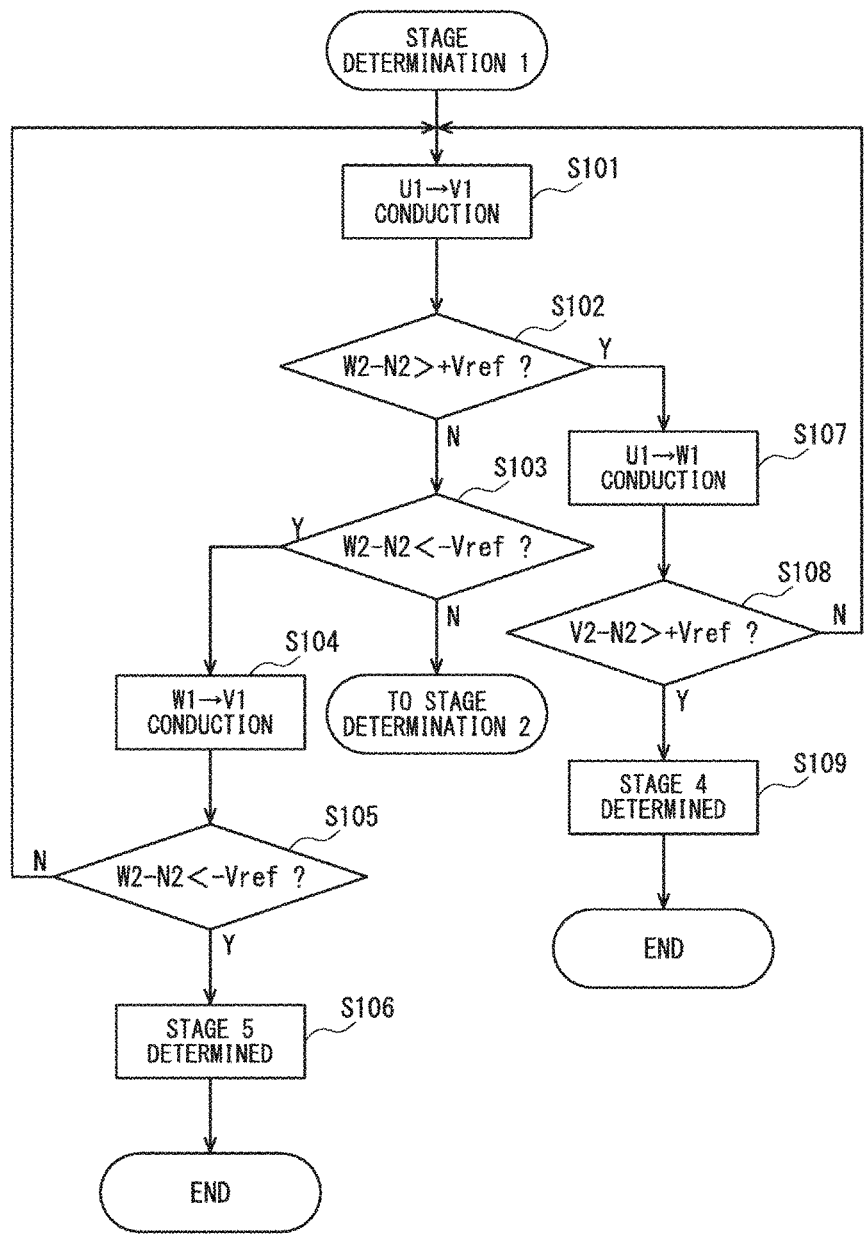
FIG. 11 is a flowchart for illustrating the stage determination process (S12) shown in FIG. 4.

Next, a flow of the stage determination process in step S12 will be described with reference to FIGS. 11 to 13. In the stage determination process, the rotor position determination circuit 75 first performs conduction from U1 to V1 (step S101 in FIG. 11). Then, the rotor position determination circuit 75 compares the voltage W2–N2 measured at the time of the conduction from U1 to V1 with a positive reference voltage +Vref (step S102). If the voltage W2–N2 is +Vref or less (step S102: N), the rotor position determination circuit 75 compares the voltage W2–N2 with a negative reference voltage –Vref (step S103).

If the voltage W2–N2 is smaller than –Vref (step S103: Y), the rotor position determination circuit 75 performs conduction from W1 to V1 (step S104). Then, the rotor position determination circuit 75 compares the voltage W2–N2 measured at the time of the conduction from W1 to V1 with the negative reference voltage –Vref (step S105). If the voltage W2–N2 is smaller than –Vref (step S105: Y), the rotor position determination circuit 75 determines the positional relationship to be the stage 5 (step S106). On the other hand, if the voltage W2–N2 is –Vref or more (step S105: N), the rotor position determination circuit 75 again performs conduction from U1 to V1 (step S101).

In step S103, if the voltage W2–N2 is –Vref or more (step S103: N), the rotor position determination circuit 75 performs processing of stage determination 2 shown in FIG. 12.

Additionally, in step S102, when the voltage W2–N2 is greater than +Vref (step S102: Y), the rotor position determination circuit 75 performs conduction from U1 to W1 (step S107). Then, the rotor position determination circuit 75 compares the voltage V2–N2 with the positive reference voltage +Vref (step S108). If the voltage V2–N2 is greater than +Vref (step S108: Y), the rotor position determination circuit 75 determines the positional relationship to be the stage 4 (step S109). On the other hand, if the voltage V2–N2 is +Vref or less (step S108: N), the rotor position determination circuit 75 again performs conduction from U1 to V1 (step S101).

Figure 12:
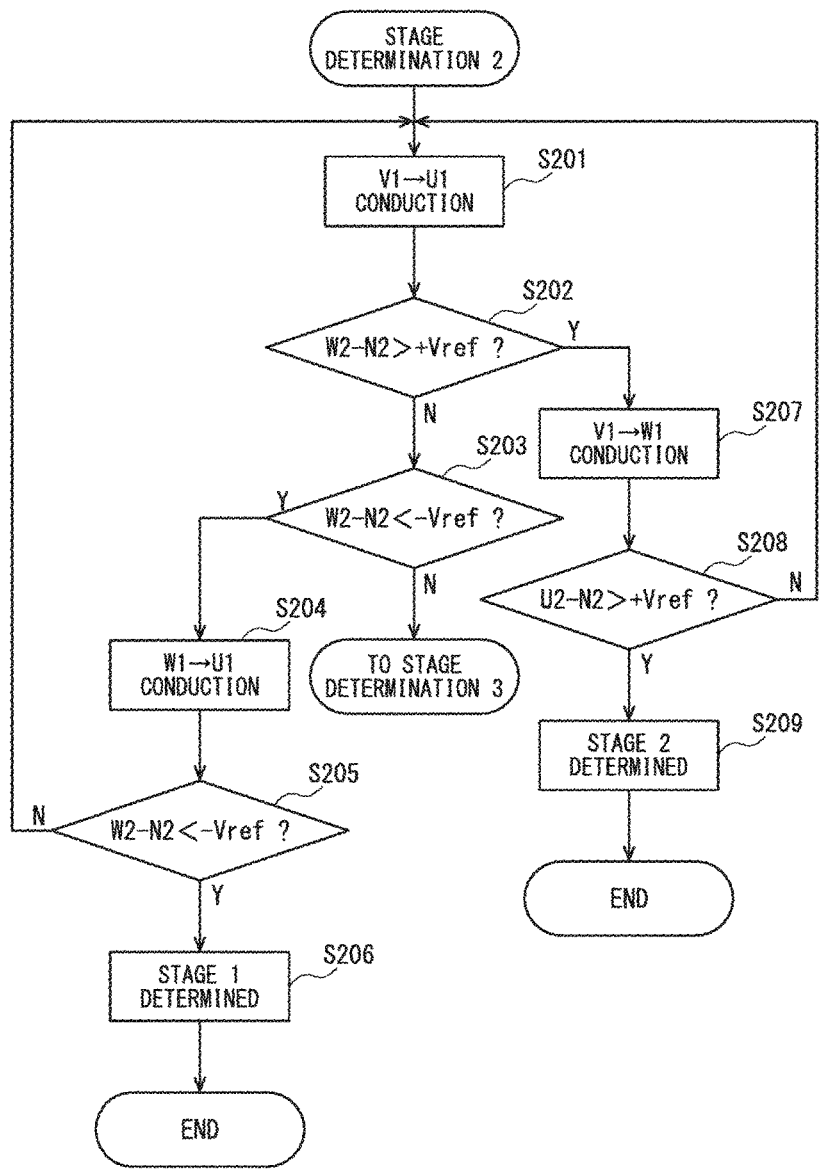
FIG. 12 is a flowchart for illustrating the stage determination process (S12) shown in FIG. 4.

On the other hand, in the stage determination 2 shown in FIG. 12, the rotor position determination circuit 75 first performs conduction from V1 to U1 (step S201). Then, the rotor position determination circuit 75 compares the voltage W2–N2 measured at the time of the conduction from V1 to U1 with the positive reference voltage +Vref (step S202). If the voltage W2–N2 is +Vref or less (step S202: N), the rotor position determination circuit 75 compares the voltage W2–N2 with the negative reference voltage –Vref (step S203).

If the voltage W2–N2 is smaller than –Vref (step S203: Y), the rotor position determination circuit 75 performs conduction from W1 to U1 (step S204). Then, the rotor position determination circuit 75 compares the voltage W2–N2 measured at the time of the conduction from W1 to U1 with the negative reference voltage –Vref (step S205). If the voltage W2–N2 is smaller than –Vref (step S205: Y), the rotor position determination circuit 75 determines the positional relationship to be the stage 1 (step S206). On the other hand, if the voltage W2–N2 is –Vref or more (step S205: N), the rotor position determination circuit 75 again performs conduction from V1 to U1 (step S201).

In step S203, if the voltage W2–N2 is –Vref or more (step S203: N), the rotor position determination circuit 75 performs processing of stage determination 3 shown in FIG. 13.

Additionally, in step S202, if the voltage W2–N2 is greater than +Vref (step S202: Y), the rotor position determination circuit 75 performs conduction from V1 to W1 (step S207). Then, the rotor position determination circuit 75 compares the voltage U2–N2 with the positive reference voltage +Vref (step S208). If the voltage U2–N2 is greater than +Vref (step S208: Y), the rotor position determination circuit 75 determines the positional relationship to be the stage 2 (step S209). On the other hand, if the voltage U2–N2 is +Vref or less (step S208: N), the rotor position determination circuit 75 again performs conduction from V1 to U1 (step S201).

Figure 13:
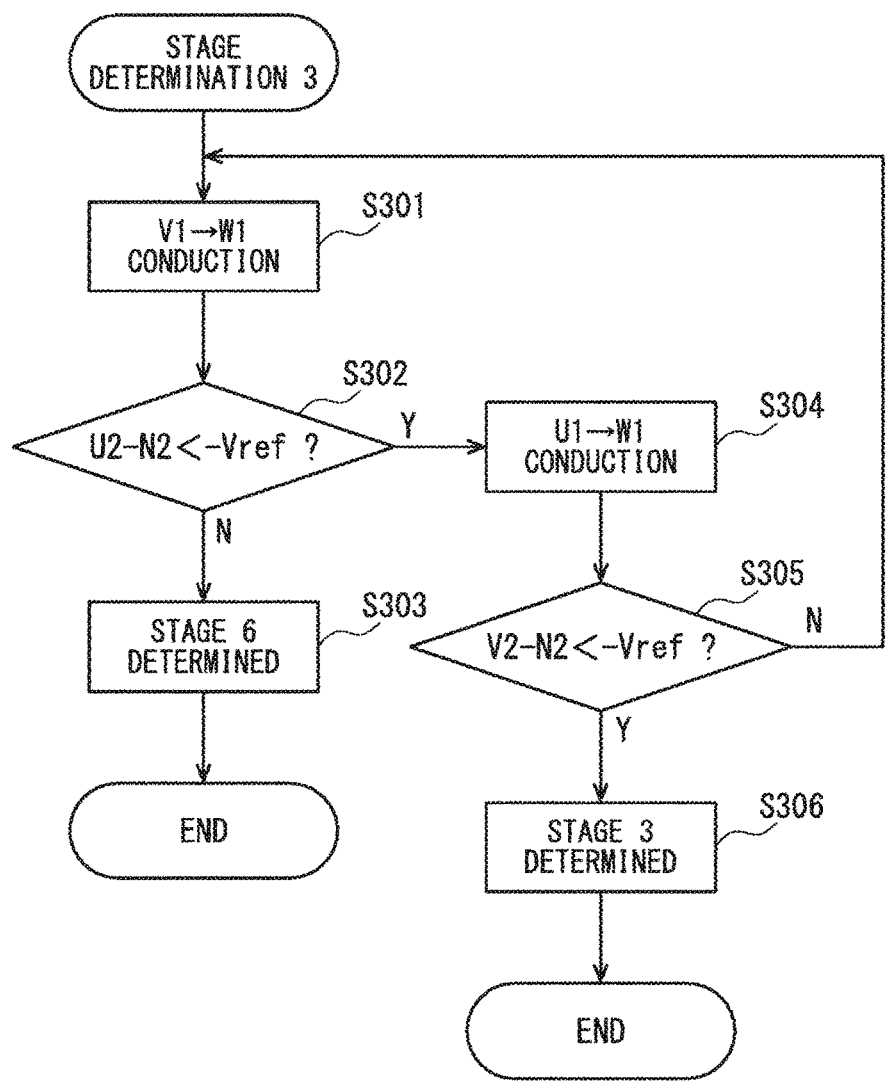
FIG. 13 is a flowchart for illustrating the stage determination process (S12) shown in FIG. 4.

Further, in the stage determination 3 shown in FIG. 13, the rotor position determination circuit 75 first performs conduction from V1 to W1 (step S301). Then, the rotor position determination circuit 75 compares the voltage U2–N2 measured at the time of the conduction from V1 to W1 with the negative reference voltage –Vref (step S302). If the voltage U2–N2 is –Vref or more (step S302: N), the rotor position determination circuit 75 determines the positional relationship to be the stage 6 (step S303).

If the voltage W2–N2 is smaller than –Vref (step S302: Y), the rotor position determination circuit 75 performs conduction from U1 to W1 (step S304). Then, the rotor position determination circuit 75 compares the voltage V2–N2 measured at the time of the conduction from U1 to W1 with the negative reference voltage –Vref (step S305). If the voltage V2–N2 is smaller than –Vref (step S305: Y), the rotor position determination circuit 75 determines the positional relationship to be the stage 3 (step S306). On the other hand, if the voltage V2–N2 is –Vref or more (step S305: N), the rotor position determination circuit 75 again performs conduction from V1 to W1 (step S301).

As described above, the rotor position determination circuit 75 performs the stage determination process in step S12. Here, in the flows shown in FIG. 13 to FIG. 11, if it is unable to confirm the conduction patterns shown in FIG. 7 after a predetermined conduction with respect to the winding portion ACG1, the rotor position determination circuit 75 appropriately performs conduction again and remeasures the induced voltage. At that time, the conduction conditions, such as a conduction time and the reference voltage for the remeasurement, may be unchanged or changed. Additionally, it is possible to limit the number of remeasurement times and a remeasurement time.

Next, in FIG. 4, the CPU 72 determines whether or not the stage determination process has been completed normally in the rotor position determination circuit 75 (step S13). On the other hand, if the stage determination process has not been completed normally (in the case of "N" in step S13), the CPU 72 again performs the determination process in step S12 (from "Y" in step S11 to step S12). On the other hand, if the stage determination process has been completed successfully (in the case of "Y" in step S13), the CPU 72 starts energization control of the MOSFETs (Q1) to (Q9) of the first power conversion unit 61 and the second power conversion unit 62 according to the conduction pattern corresponding to the stage determined by the rotor position determination circuit 75 (step S14). At that time, the CPU 72 sets the conduction angle of the first power conversion unit 61 to, for example, 180°, and sets the conduction angle of the second power conversion unit 62 to 120° or more and smaller than 180°.

Then, after the starter generator 1 starts rotating, the zero-cross detection circuit 74 generates a stage signal based on the zero-cross points of the output voltage of the winding portion ACG2 and outputs the generated stage signal to the CPU 72 (step S15). Then, the CPU 72 performs energization control on the first power conversion unit and the second power conversion unit according to the pattern corresponding to the stage detected by the zero-cross detection circuit 74 (step S15).

Figure 14:
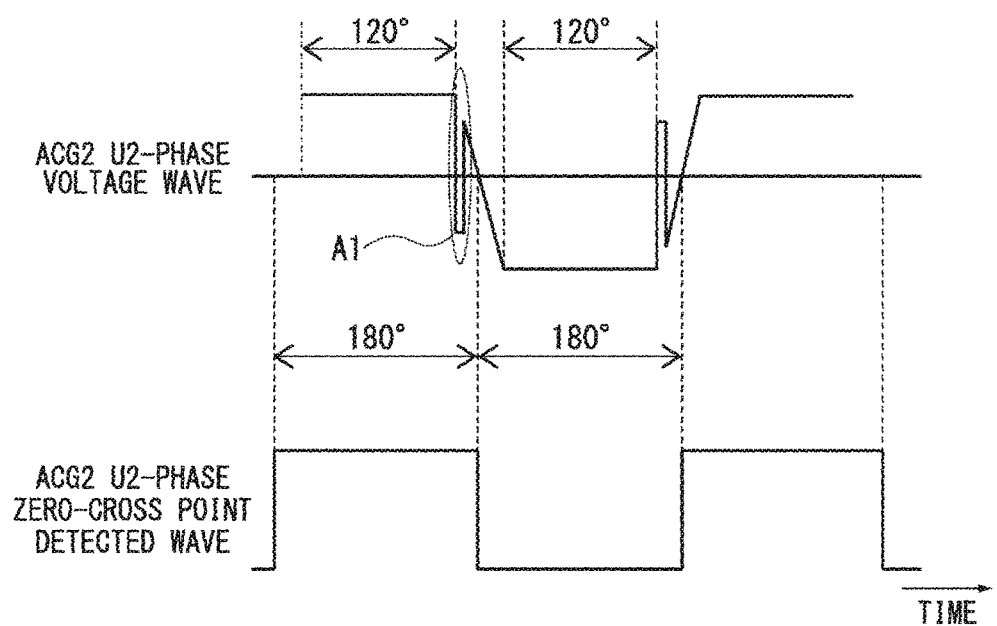
FIG. 14 is a waveform diagram for illustrating a process (S15) shown in FIG. 4.

Here, a voltage waveform of the winding portion ACG2 during the rotation at the time of the starter motor starting control will be described with reference to FIG. 14. FIG. 14 is a waveform diagram schematically showing a waveform of the output voltage the winding U2 of the winding portion ACG2 and a waveform of the zero-cross points of the output voltage of the winding U2 detected by the rotor position determination circuit 75. In this case, the conduction angle of the second power conversion unit 62 in step S14 and step S15 is set to 120°. In FIG. 14, the waveform of the detected zero-cross points rises or falls in the same direction as the change of the output voltage at the zero cross points of the output voltage. Here, in the voltage waveform of the winding portion ACG2, noise is generated at the timing of switching the phase (dashed area A1). Therefore, it is desirable for the rotor position determination circuit 75 to mask the noise at the switching timing so as not to affect the zero-cross detection. The zero-cross detection circuit 74 generates the detected waveforms of the respective phases from the output voltage waveforms of the respective windings U2, V2, and W2, generates a stage signal indicating the rotor position based on the detected waveform of each phase, and outputs the generated stage signal to the CPU72.

Next, in FIG. 4, the CPU 72 determines whether or not the starting of the engine has been completed (step S16). If the starting of the engine has not been completed (in the case of "N" in step S16), the CPU 72 returns to step S15 and continues the energization control according to the pattern corresponding to the stage detected by the zero-cross detection circuit 74 (step S15). If the starting of the engine has been completed (in the case of "Y" in step S16), the CPU 72 stops the motor conduction and ends the starter motor starting control (step S17).

As described above, in the starter motor control, first, all the MOSFETs of the second power conversion unit 62 are tuned off. Then, using the first power conversion unit 61, the short pulse to the extent that the motor will not move is conducted to the winding portion ACG1 sequentially according to the predetermined conduction patterns. Then, based on the information regarding the voltage induced in both winding ends of the other winding portion ACG2, the rotor position determination circuit 75 determines a rotor stage at the time the rotor is stopped. Then, according to the conduction pattern corresponding to the rotor stage identified by the rotor position determination circuit 75, the CPU 72 starts conduction of the first power conversion unit 61 and the second power conversion unit 62 connected to the respective phases of the winding portions ACG1 and winding section ACG2, at any one angle of 180° for the first power conversion unit 61, and 120° or more and less than 180° for the second power conversion unit 62. Then, after the start of conduction, based on the rotor position information derived from the zero-cross points of the winding portion ACG2 detected by the zero-cross detection circuit 74, the CPU 72 performs conduction of the winding portion ACG1 and the winding portion ACG2 until the starting of the engine is completed. This makes it possible in the present embodiment to use the winding portion ACG2 for the zero-cross point detection at the starting, and to use both the winding portion ACG1 and the winding section ACG2 as the starting windings. Additionally, the conduction mode for the winding portion ACG1 is set to 180°, while the conduction mode for the winding portion ACG2 is set to as large a conduction angle as possible to the extent that zero-cross points can be detected. This makes it possible to minimize a reduction in starting torque from the case where both the winding portion ACG1 and the winding portion ACG2 are set to the 180° conduction mode.

Figure 15:
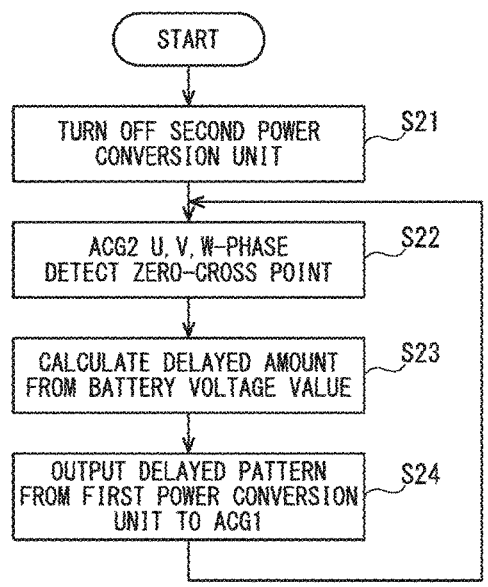
FIG. 15 is a flowchart illustrating an example of power generation control of the starting power generation apparatus 100 shown in FIG. 1.
Figure 16:
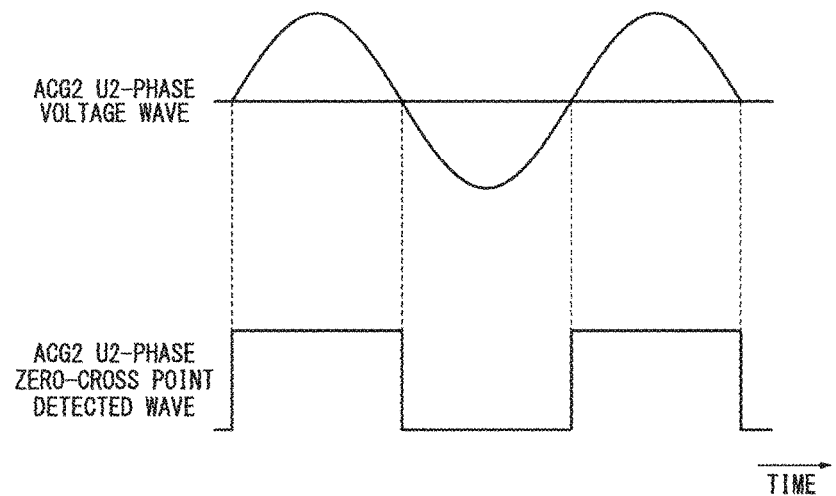
FIG. 16 is a waveform diagram for illustrating a process (S22) shown in FIG. 15.

Next, the case of operating the starter generator 1 as the power generator will be described with reference to FIG. 15 and FIG. 16. FIG. 15 is a flowchart showing an example of power generation control by the starting power generation apparatus 100 shown in FIG. 1. After the completion of the starting of the engine 2, the CPU 72 turns off the respective MOSFETs (Q7) to (Q9) of the second power conversion unit 62 (step S21).

Then, the CPU 72 receives the stage signal generated by the zero-cross detection circuit 74 based on the zero-cross points of the output voltage of the winding portion ACG2 (step S22).

Here, the voltage waveform of the winding portion ACG2 at the time of the power generation control will be described with reference to FIG. 16. FIG. 16 is a waveform diagram schematically showing a waveform of the output voltage of the winding U2 of the winding portion ACG2 and a waveform of the zero-cross points of the output voltage of the winding U2 which are detected by the rotor position determination circuit 75. In this case, the second power conversion unit 62 has been controlled to be in the off state. The waveform of the detected zero-cross points rises or falls in the same direction as that of the change of the output voltage at the zero cross points of the output voltage. The zero-cross detection circuit 74 generates the detected waveforms of the respective phases from the waveforms of the respective output voltages of the windings U2, V2, and W2 as shown in FIG. 16, and based on the detected waveform of each phase, generates a stage signal stepwise indicating the rotor position and outputs the stage signal to the CPU 72.

Then, the CPU 72 calculates the conduction angle of the first power control unit 61 based on the voltage value of the battery 9 (step S23). Then, the CPU 72 outputs from the first power conversion unit 61 to the winding section ACG1, a delayed angle pattern based on a delayed amount calculated in step S23 (step S24). Then, the CPU 72 returns to step S22 and performs the above-described processing again.

As described above, in the power generation control, all the MOSFETs of the second power conversion unit 62 are turned off after the start of the engine, thereby preventing generation of the excess power. Additionally, a rotor position is derived by the zero-cross detection circuit 74 from the zero-cross points of the no-load voltage generated in both winding ends of the winding portion ACG2, thereby generating a timing necessary for the first power conversion unit 61 to perform phase control of the AC voltage of the winding portion ACG1. This makes it possible in the present embodiment to supply the optimum electric power to the battery 9 and the electrical load (not shown).

As described above, according to the present embodiment, it is possible to inexpensively perform positioning of the rotor in a simple manner without using an expensive sensor and without using a sub-coil.

Additionally, the present embodiment is provided with: the starter generator 1 (ACG starter motor) including the armature unit in which the winding portion ACG1 and the winding portion ACG2 which constitute the three-phase windings (multi-phase windings) are arranged in parallel and the field portion including the permanent magnets; the first power conversion unit 61 connected to the winding portion ACG1 or the winding portions ACG1 and ACG2, and configured to perform power conversion between AC and DC; the plurality of MOSFETs (switching elements) (Q7) to (Q9) interposed between the respective AC terminals 611, 612, and 613 of the first power conversion unit 61 which are connected to the respective ends of the winding ACG1, and the respective ends of the winding portion ACG2, and configured to connect or disconnect the respective ends of the winding portion ACG2 to or from the respective AC terminals 611, 612, and 613. According to this configuration, it is possible to easily improve the control characteristics of the starter generator 1, such as a reduction in power loss.

Further, as described above, according to the present embodiment, the winding portion is divided into two, and the case of using both ones and the case of using either one are switched selectively, thereby making it possible to optimize the balance between the power generation and the electrical load. According to this configuration, it is possible to reduce the surplus power to be generated by the unbalance with the electrical load when the motor with the specifications designed to meet the torque characteristics of the starter motor is used as a power generator. In other words, it is possible to reduce the reflux current of the winding portion and heat generation (power loss) of the winding and the power device elements. Therefore, the excess power at the time of the power generation can be easily reduced without impairing the motor torque. This enables an improvement in fuel efficiency and a reduction in friction of the engine 2.

Moreover, the reflux current is reduced at the time of the power generation control, thereby making it possible to reduce heat generation of the armature winding and the power devices.

Figure 17:
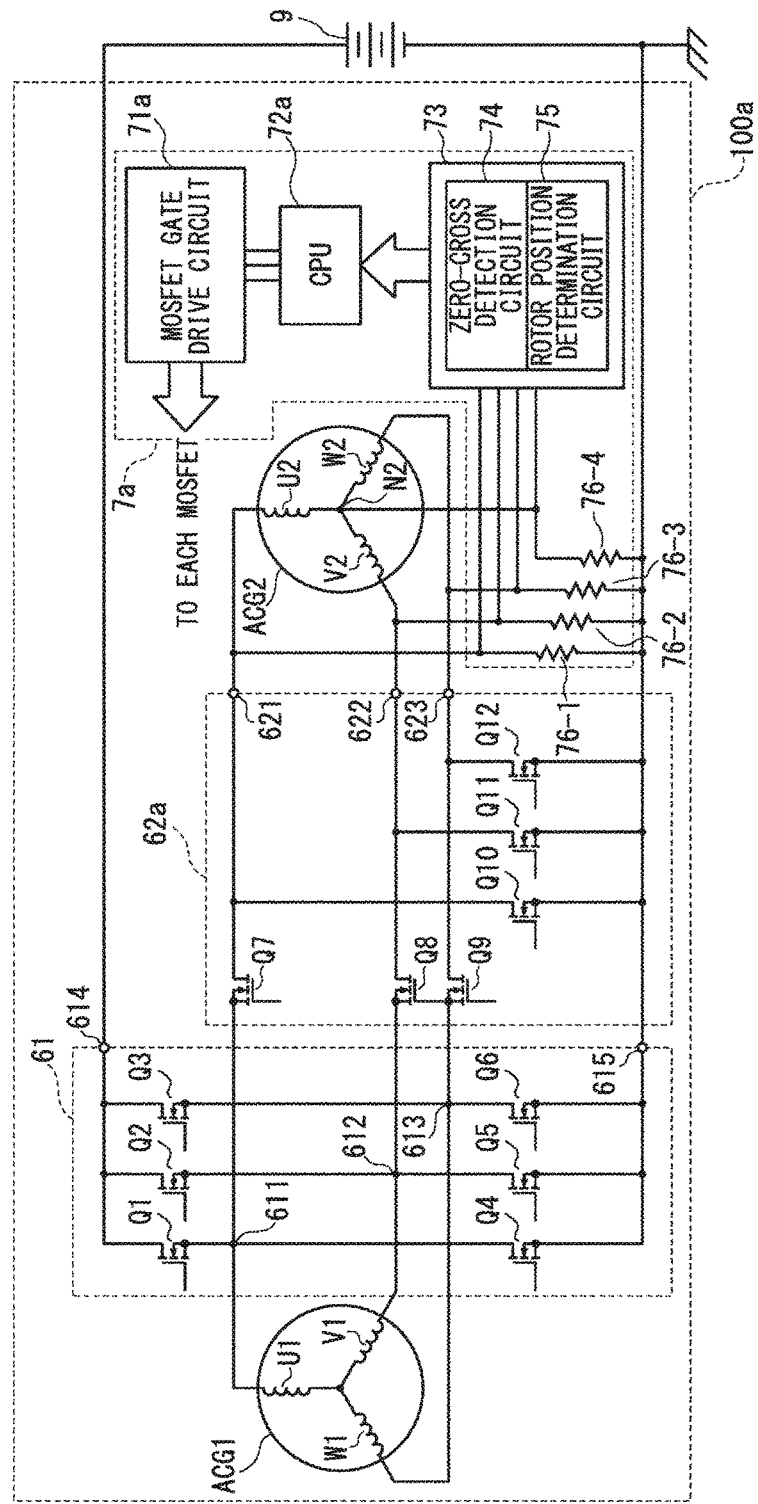
FIG. 17 is a circuit diagram for illustrating a configuration of a second embodiment of the present invention.

Next, a second embodiment of the present invention will be described with reference to FIG. 17. FIG. 17 is a block diagram showing a configuration example of a starting power generation control apparatus 100b according to a second embodiment of the present invention. Here, in FIG. 17, the same components as those shown in FIG. 3 are appended with the same reference numerals and description thereof is omitted. Additionally, in FIG. 17, components with the same basic functions as those shown in FIG. 3 are appended with the same reference numerals with the letter "a" added at the end thereof. The configuration and operation of the detection and determination circuit section 73 are the same as those of the above embodiment.

A starting power generation control apparatus 100a of the second embodiment differs from the starting power generation control apparatus 100 shown in FIG. 3 in the following points. In other words, a second power conversion unit 62a is newly provided with MOSFETs (Q10) to (Q12). In this case, a drain of the MOSFET (Q10) is connected to the drain of the MOSFET (Q7). A drain of the MOSFET (Q11) is connected to the drain of the MOSFET (Q8). A drain of the MOSFET (Q12) is connected to the drain of the MOSFET (Q9). Respective sources of the MOSFET (Q10), the MOSFET (Q11), and the MOSFET (Q12) are grounded.

Additionally, in the control unit 7a, a MOSFET gate drive circuit 71a is added with circuits for the newly provided MOSFETs (Q10) to (Q12), compared to the MOSFET gate drive circuit 71 shown in FIG. 3. Further, the CPU 72a is configured such that a program for the newly provided MOSFETs (Q10) to (Q12) is added to the CPU 72 shown in FIG. 3.

According to the starting power generation control apparatus 100a of the second embodiment, two sets of MOSFETs on the negative side, one of which is for the winding portion ACG1 and the other one of which is for the winding portion ACG2, are provided, thereby making it possible to limit the current flowing to the MOSFETs on the negative side and to reduce heat generation of the respective MOSFETs.

Figure 18:
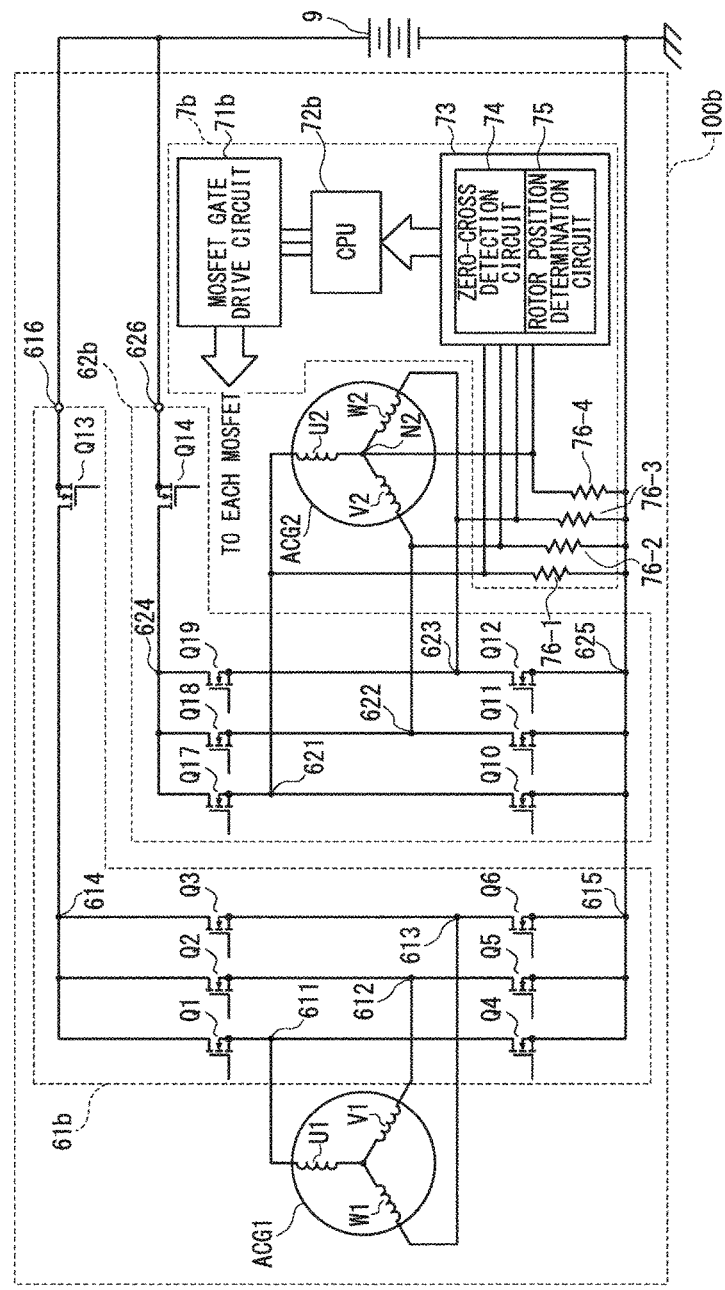
FIG. 18 is a circuit diagram for illustrating a configuration of a third embodiment of the present invention.

Next, a third embodiment of the present invention will be described with reference to FIG. 18. FIG. 18 is a block diagram showing a configuration example of a starting power generation control apparatus 100b according to the third embodiment of the present invention. Here, in FIG. 18, the same components as those shown in FIG. 3 or FIG. 17 are appended with the same reference numerals and description thereof is omitted. Additionally, in FIG. 18, components with the same basic functions as those shown in FIG. 3 are appended with the same reference numerals with the letter "b" added at the end thereof. The configuration and operation of the detection and determination circuit section 73 are the same as those of the above embodiment.

The starting power generation control apparatus 100b of the third embodiment differs from the starting power generation control apparatus 100 shown in FIG. 3 in the following points. In other words, the first power conversion unit 61b is newly provided with a MOSFET (Q13) (first switching element), compared to the first power conversion unit 61 shown in FIG. 3. The MOSFET (Q13) is interposed between a positive-side DC terminal 614 and a positive-side DC terminal 616 connected to the battery 9. A drain of the MOSFET (Q13) is connected to the positive-side DC terminal 614, while a source of the MOSFET (Q13) is connected to the positive-side DC terminal 616.

A second power conversion unit 62b includes six MOSFETs (Q17) to (Q19) and (Q10) to (Q12) which constitute a three-phase bridge orthogonal converter circuit. Additionally, the orthogonal conversion unit 62b includes: a positive side DC terminal 624 on a positive side of DC input and output lines of the three-phase bridge orthogonal converter circuit that includes the MOSFETs (Q17) to (Q19) and (Q10) to (Q12); and a negative-side DC terminal 625 on a negative side thereof. The three-phase bridge orthogonal converter circuit including the MOSFETs (Q17) to (Q19) and (Q10) to (Q12) connects the windings U2, V2, and W2 of the winding portion ACG2 respectively to the AC terminals 621, 622, and 623, and performs bidirectional power conversion between DC and AC.

Additionally, the second power conversion unit 62b includes a MOSFET (Q14) (second switching element) between the positive-side DC terminal 624 and the positive-side DC terminal 626 connected to the battery 9. A drain of the MOSFET (Q14) is connected to the positive-side DC terminal 624, while a source of the MOSFET (Q14) is connected to the positive-side DC terminal 626.

Here, as compared to the second power conversion unit 62 shown in FIG. 3, the MOSFETs (Q7) to (Q9) are omitted in the second power conversion unit 62b.

Additionally, in the control unit 7b, the MOSFET gate drive circuit 71b has been added with circuits for the newly provided MOSFETs (Q10) to (Q14) and (Q17) to (Q19), compared to the MOSFET gate drive circuit 71 shown in FIG. 3. Further, regarding the CPU 72b, a program for the newly provided MOSFETs (Q10) to (Q14) and (Q17) to (Q19) has been modified, compared to the CPU 72 shown in FIG. 3.

The starting power generation control apparatus 100b of the third embodiments turns on or off the MOSFET (Q13) and the MOSFET (Q14), thereby making it possible to, at the time of power generation control, control the generated power to be output only from the winding portion ACG1, to be output only from the winding portion ACG2, or to be output from both the winding portion ACG1 and the winding portion ACG2.

As described above, according to the starting power generation control apparatus 100b of the third embodiment, the winding portion is divided into, for example, two, and the case of using both ones and the case of using either one are selectively used, thereby making it possible to optimize the balance between the power generation and the electrical load. According to this configuration, it is possible to reduce the surplus power generated by the unbalance with the electrical load when the motor with the specifications designed to meet the torque characteristics of the starter motor is used as a power generator. In other words, it is possible to reduce the reflux current of the winding portion and heat generation (power loss) of the winding and the power device elements. Therefore, the excess power at the time of the power generation can be easily reduced without impairing the motor torque. This enables an improvement in fuel efficiency and a reduction in friction of the engine 2.

Additionally, the specifications (the number of turns, wire diameter, etc.) of the winding portion ACG1 are made different from those of the winding portion ACG2, thereby making it possible to select a generated torque for the motor control and a power generation output for the power generation control from three levels that are, for example, a case of using the winding portion ACG1, a case of using the wiring portion ACG2, and a case of using both the winding portion ACG1 and the winding portion ACG2.

Figure 19:
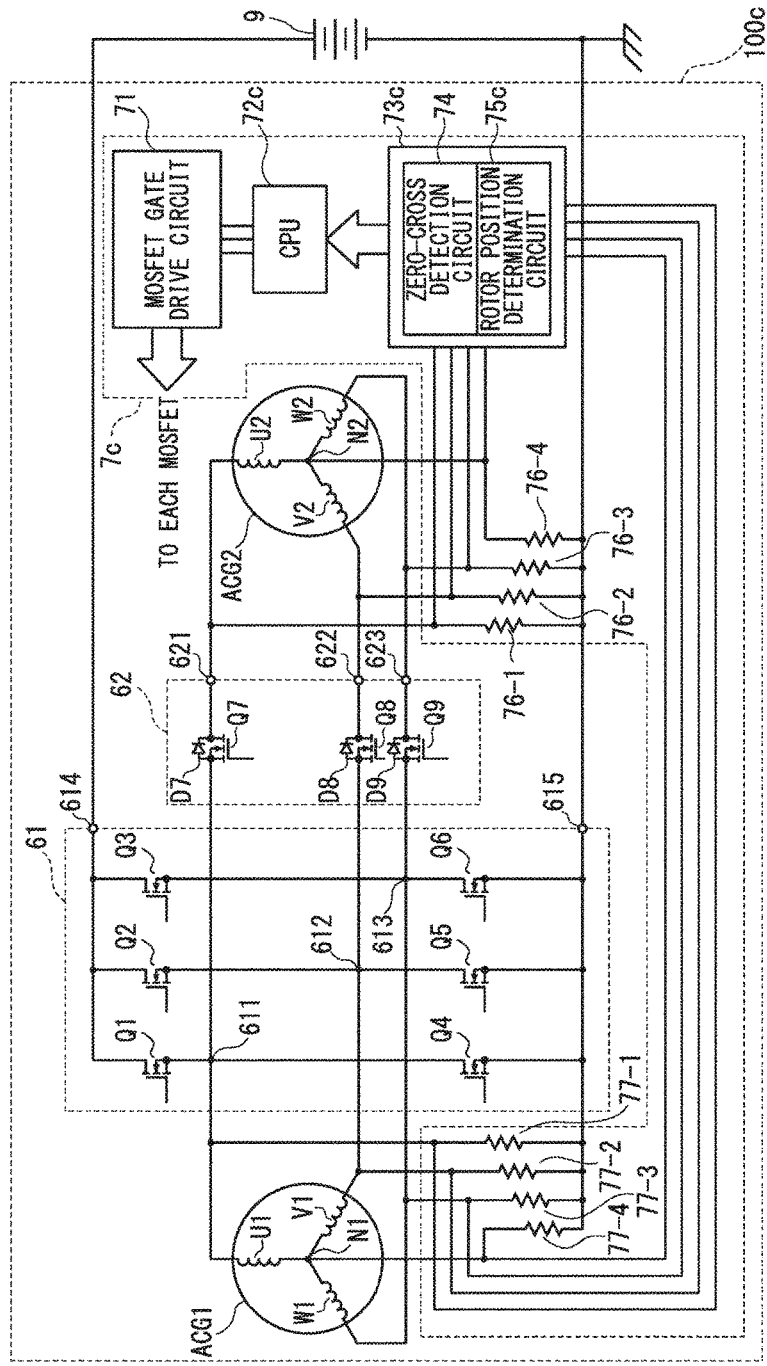
FIG. 19 is a circuit diagram for illustrating a configuration of a fourth embodiment of the present invention.

Next, a fourth embodiment of the present invention will be described with reference to FIG. 19. FIG. 19 is a block diagram showing a configuration example of a starting power generation control apparatus 100c according to the fourth embodiment of the present invention. Here, in FIG. 19, the same components as those shown in FIG. 3 are appended with the same reference numerals and description thereof is omitted. Additionally, in FIG. 19, components with the same basic functions as those shown in FIG. 3 are appended with the same reference numerals with the letter "c" added at the end thereof. Hereinafter, differences from the starting power generation control apparatus 100 of the first embodiment will be described.

In the starting power generation control apparatus 100c of the fourth embodiment, the control unit 7c includes the MOSFET gate drive circuit 71, a CPU 72c, a detection and determination circuit portion 73c, and resistors 76-1 to 76-4, and newly includes resistors 77-1 to 77-4. One end of the resistor 77-1 is connected to the winding U1, while the other end thereof is grounded. One end of the resistor 77-2 is connected to the winding V1, while the other end thereof is grounded. One end of the resistor 77-3 is connected to the winding W1, while the other end thereof is grounded. Additionally, one end of the resistor 77-4 is connected to the neutral point N1, while the other end thereof is grounded. The terminal voltages of the resistors 77-1 to 77-4 are input to the detection and determination circuit portion 73c. The detection and determination circuit unit 73c includes the zero-cross detection circuit 74 and a rotor position determination circuit 75c.

Operation of the starting power generation control apparatus 100c of the fourth embodiment is the same as that of the starting power generation control apparatus 100 described with reference to FIG. 4, except the following. The differences are the contents of the stage determination process in step S12 shown in FIG. 4.

Figure 20:
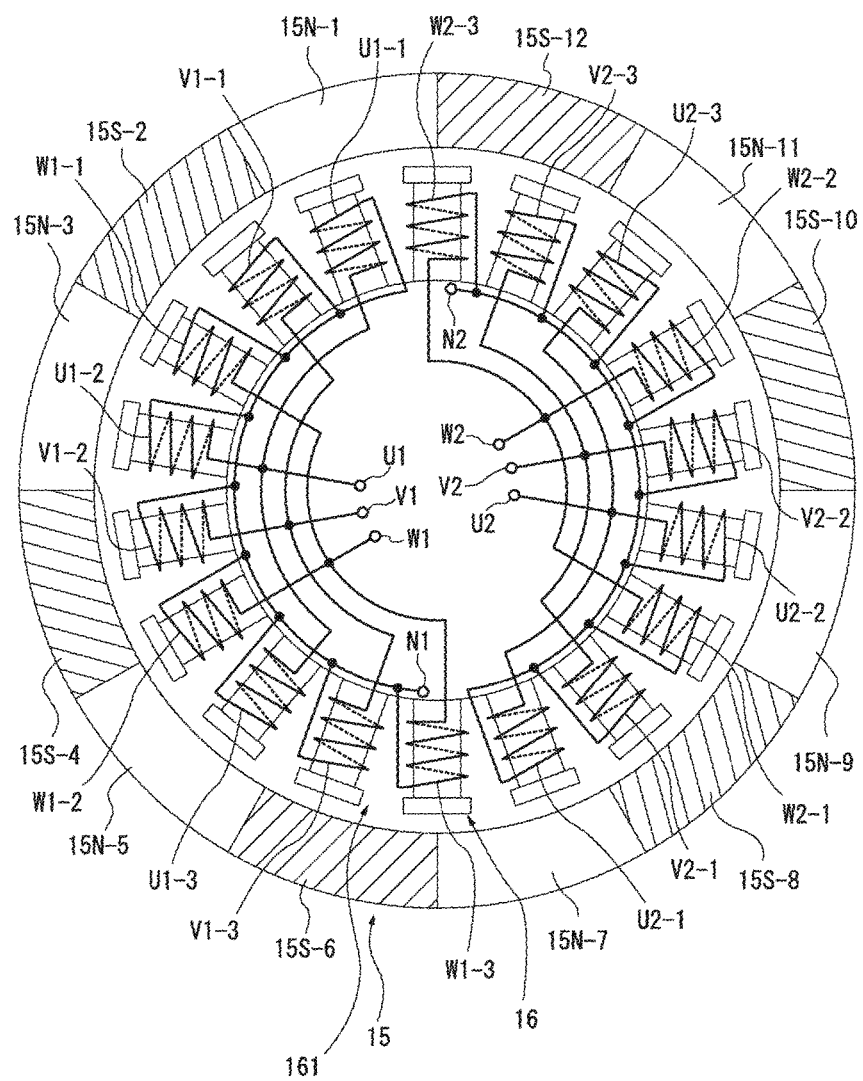
FIG. 20 is a schematic view for illustrating a stage determination process in the fourth embodiment.

In the fourth embodiment, at the stop of the starter generator 1, the rotor position determination circuit 75c determines in the following manner in which predetermined stage a position of the rotor is present, and outputs a result of the determination to the CPU 72c. The determination of the stage by the rotor position determination circuit 75c is performed by the second power conversion unit 62 in a state where the winding portion ACG2 is electrically released. The rotor position determination circuit 75c determines the rotor stage based on information regarding a voltage (size, polarity) induced in the non-conducted windings U1, V1, or W1 of the winding portion ACG1, when a short pulse to the extent that the motor will not move is sequentially supplied using the first power conversion unit 61 to the windings U1, V1, or W1 of the winding portion ACG1 according to predetermined conduction patterns. This point is different from the case where the starting power generation control apparatus 100 of the first embodiment measures the voltage generated in the winding portion ACG2 when the winding portion ACG1 is conducted. In the configuration of the armature unit 161 shown in FIG. 5, which has been used as an example in describing the first embodiment, each slot of the armature core 16 is wound alternately with one of the windings U1-1 to U1-3, V1-1 to V1-3, or W1-1 to W1-3 and one of the windings U2-1 to U2-3, V2-1 to V2-3, or W2-1 to W2-3. In such an arrangement relationship between the winding portion ACG1 and the winding portion ACG2, it is possible to generate a relatively large voltage in the winding portion ACG2 when the winding portion ACG1 is conducted. On the other hand, for example, as shown in FIG. 20, in a case where there is a bias in the arrangement relationship between the winding section ACG1 and the winding portion ACG2, a voltage generated in the winding portion ACG2 when the winding portion ACG1 is conducted becomes relatively small. In the case where there is a bias in the arrangement relationship between the winding section ACG1 and the winding portion ACG2, the rotor position determination circuit 75c of the fourth embodiment can determine each stage relatively accurately.

Similar to FIG. 5, FIG. 20 is a schematic diagram showing a configuration example of the field portion 15 of the starter generator 1 and the armature unit 161 including the armature core 16, the winding portion ACG1, and the winding portion ACG2. Among the respective slots of the armature core 16 shown in FIG. 20, successive half slots are wound with the windings U1-1 to U1-3, V1-1 to V1-3, and W1-1 to W1-3, while the remaining slots are wound with the windings U2-1 to U2-3, V2-1 to V2-3, and W2-1 to W2-3, respectively.

Figure 21:
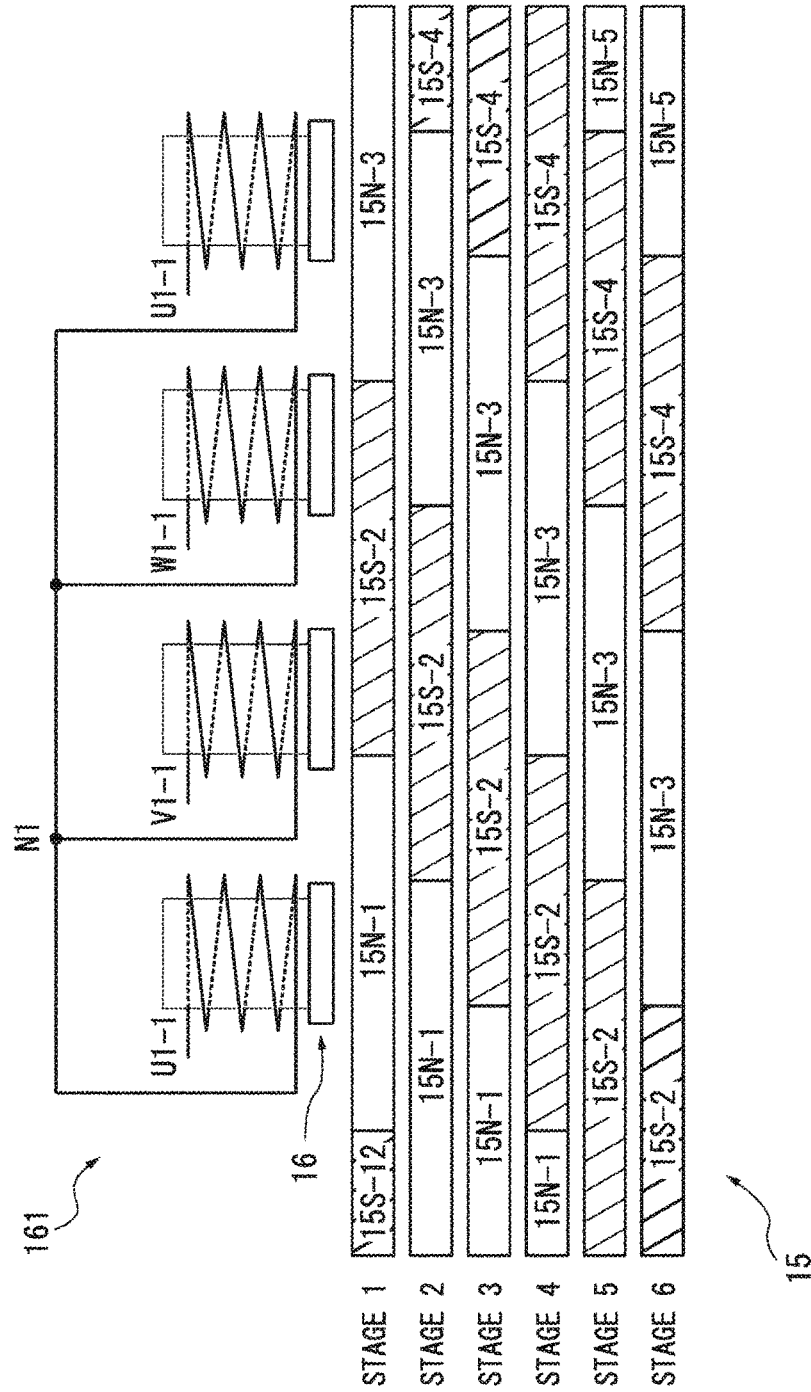
FIG. 21 is a schematic view for illustrating the stage determination process in the fourth embodiment.

Further, FIG. 21 schematically shows a position relationship among the six stages of rotor in combination with the field portion 15 and the armature unit 161 shown in FIG. 19. Each stage differs in electrical angle of 60°.

Similar to FIG. 7, FIG. 22 shows a correspondence relationship among a conduction pattern, an induced voltage, and a result of stage determination. An induced voltage "W1−N1" is a voltage of the winding W1 relative to the neutral point N1. An induced voltage "U1−N1" is a voltage of the winding U1 relative to the neutral point N1. Additionally, an induced voltage "V1−N1" is a voltage of the winding V1 relative to the neutral point N1. In step S12, the rotor position determination circuit 75c sequentially measures the voltage "W1−N2" in the case of the conduction pattern "U1⇒V1" and the conduction pattern "V1⇒U1," the voltage "U1−N2" in the case of the conduction pattern "V1⇒W1" and the conduction pattern "W1⇒V1," and the voltage "V1−N2" in the case of the conduction pattern "W1⇒U1" and the conduction pattern "U1⇒W1." Then, the rotor position determination circuit 75c determines a stage based on results of measuring the induced voltages in the respective conduction patterns. For example, the rotor position determination circuit 75c can determine a stage based on a result of comparison between the induced voltage and the positive and negative reference voltage. In the example of FIG. 22, for example, when both the voltage "W2−N1" in the case of the conduction pattern "V1⇒U1" and the voltage "V1−N1" in the case of the conduction pattern "W1⇒U1" have the negative polarity, and absolute values of thereof are greater than the reference voltage, the rotor position determination circuit 75c can determine to be the stage 1, the positional relationship between the field portion 15 and the armature unit 161.

Next, how the induced voltage is generated in the stage 1, the stage 2, and the stage 5 will be described with reference to FIGS. 23 to 25.

Figure 23:
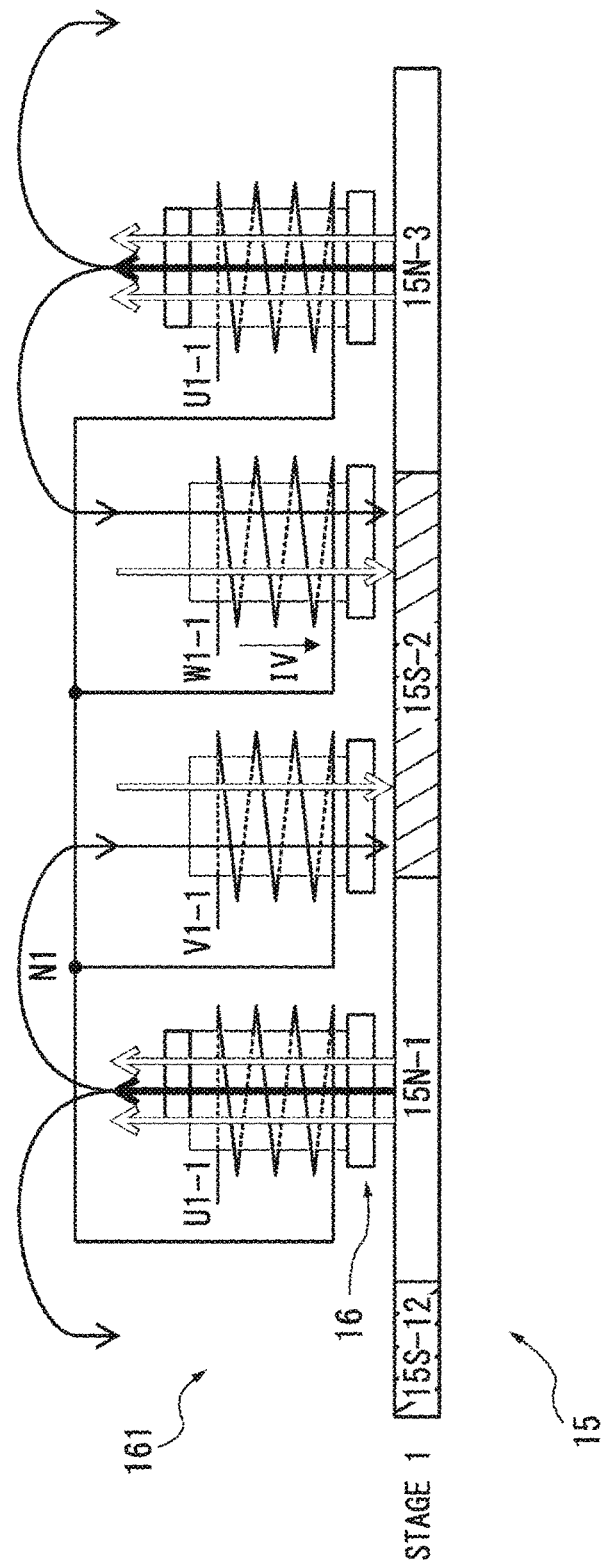
FIG. 23 is a schematic view for illustrating the stage determination process in the fourth embodiment.

FIG. 23 shows by arrows magnetic fluxes to be generated in the stage 1. The magnetic fluxes before conduction have a distribution indicated by the hollow arrows. In the case of conduction U1→N1→V1, the magnetic pole of U1 facing the magnet 15N-1 is magnetized to be the N-pole, while the magnetic pole of V1 facing the magnet 15S-2 is magnetized to be the S-pole, so as to become in the opposite direction to magnetic field lines by the magnets. Thereby, magnetic fluxes (black arrows) crossing each winding decrease, so that an induced voltage IV in the direction from W1 to U1 is generated in the floating winding W1. The magnetic flux of the winding W1 decreases from one to 0.5, so that a small voltage is generated.

Figure 24:
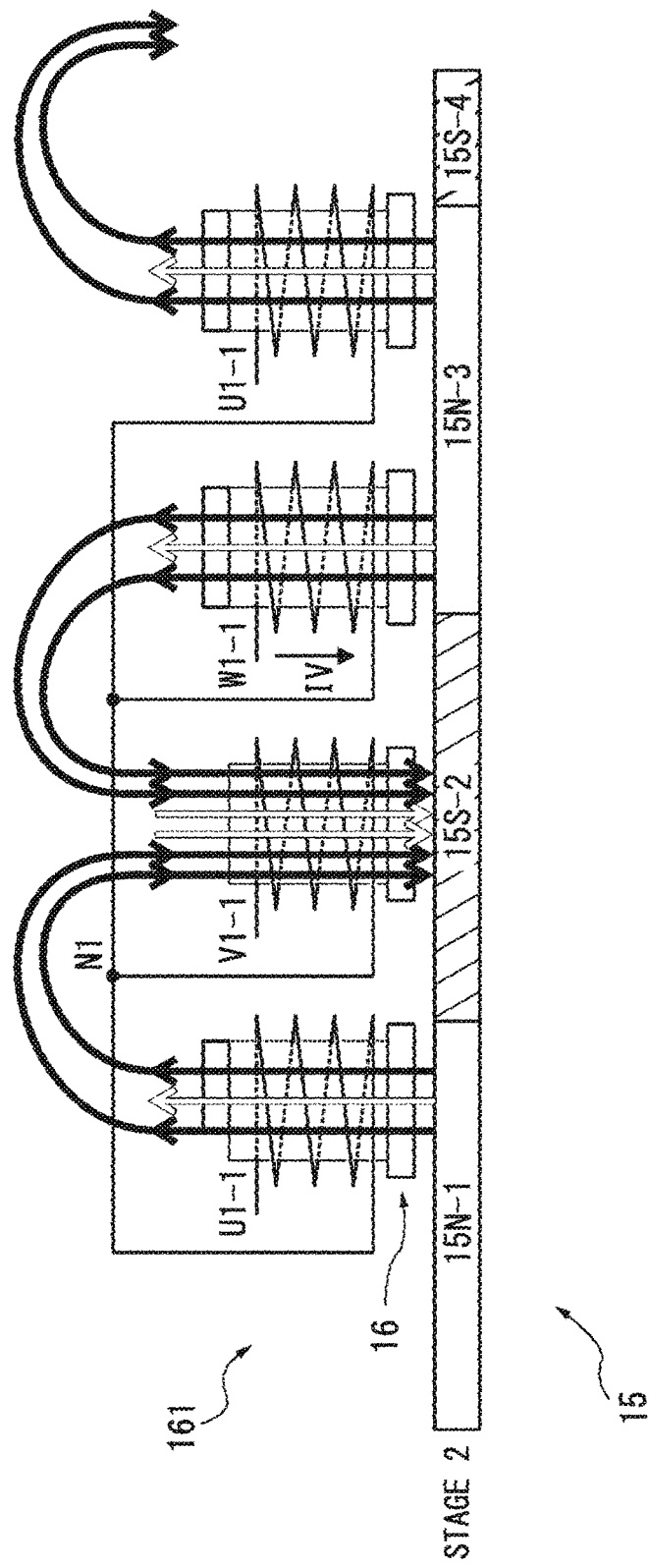
FIG. 24 is a schematic view for illustrating the stage determination process in the fourth embodiment.

FIG. 24 shows by arrows magnetic fluxes to be generated in the stage 2. The magnetic fluxes before conduction have a distribution indicated by the hollow arrows. In the case of conduction V1→N1→U1, the magnetic pole of U1 facing the magnet 15N-1 is magnetized to be the S-pole, while the magnetic pole of V1 facing the magnet 15S-2 is magnetized to be the N-pole, so as to become in the same direction as magnetic field lines by the magnets. Thereby, magnetic fluxes (black arrows) crossing each winding increase, so that an induced voltage IV in the direction from W1 to N1 is generated in the floating winding W1. The magnetic flux of the induced voltage of the winding W1 increases by one, so that a large voltage is generated.

Figure 25:
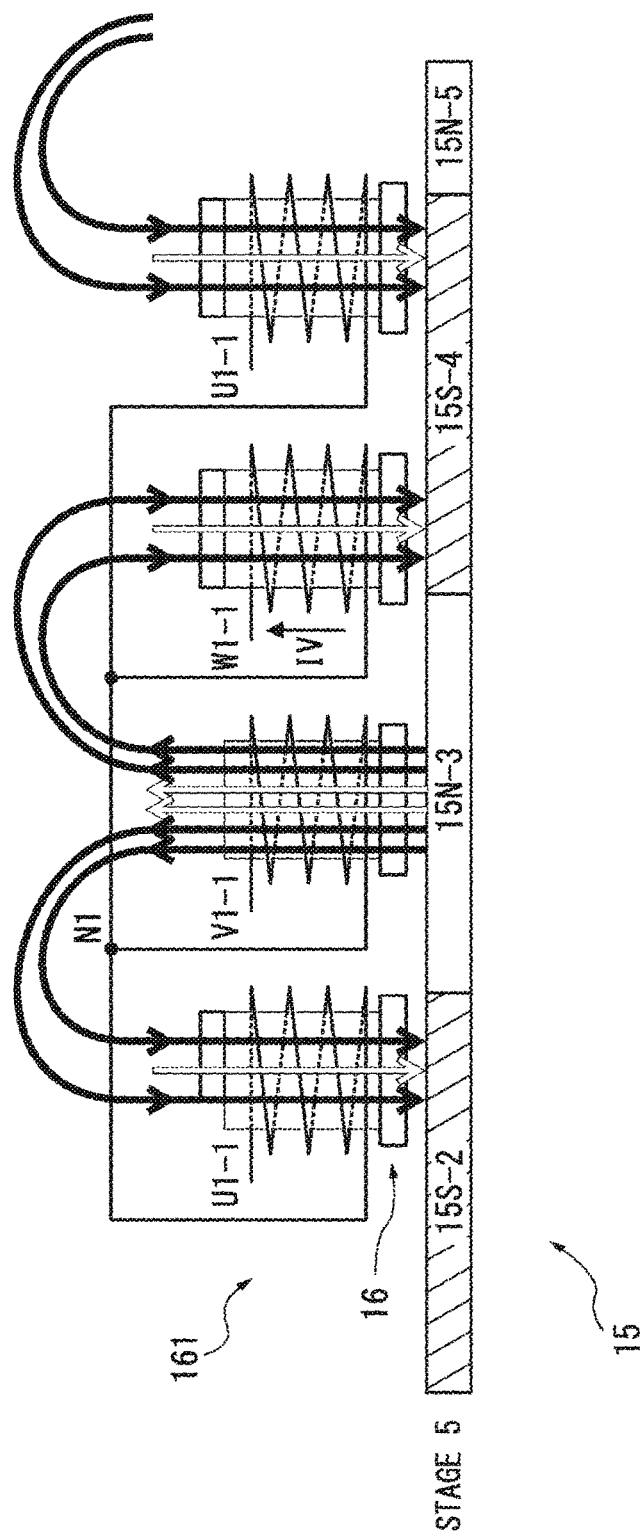
FIG. 25 is a schematic view for illustrating the stage determination process in the fourth embodiment.

FIG. 25 shows by arrows magnetic fluxes to be generated in the stage 5. The magnetic fluxes before conduction have a distribution indicated by the hollow arrows. In the case of conduction U1→N1→V1, the magnetic pole of U1 facing the magnet 15S-2 is magnetized to be the N-pole, while the magnetic pole of V1 facing the magnet 15N-3 is magnetized to be the S-pole, so as to become in the same direction as magnetic field lines by the magnets. Thereby, magnetic fluxes crossing each winding increase, so that an induced voltage IV in the direction from N1 to W1 is generated in the floating winding W1. The magnetic flux of the induced voltage generated in the winding W1 increases by one, so that a large voltage is generated.

Figure 26:
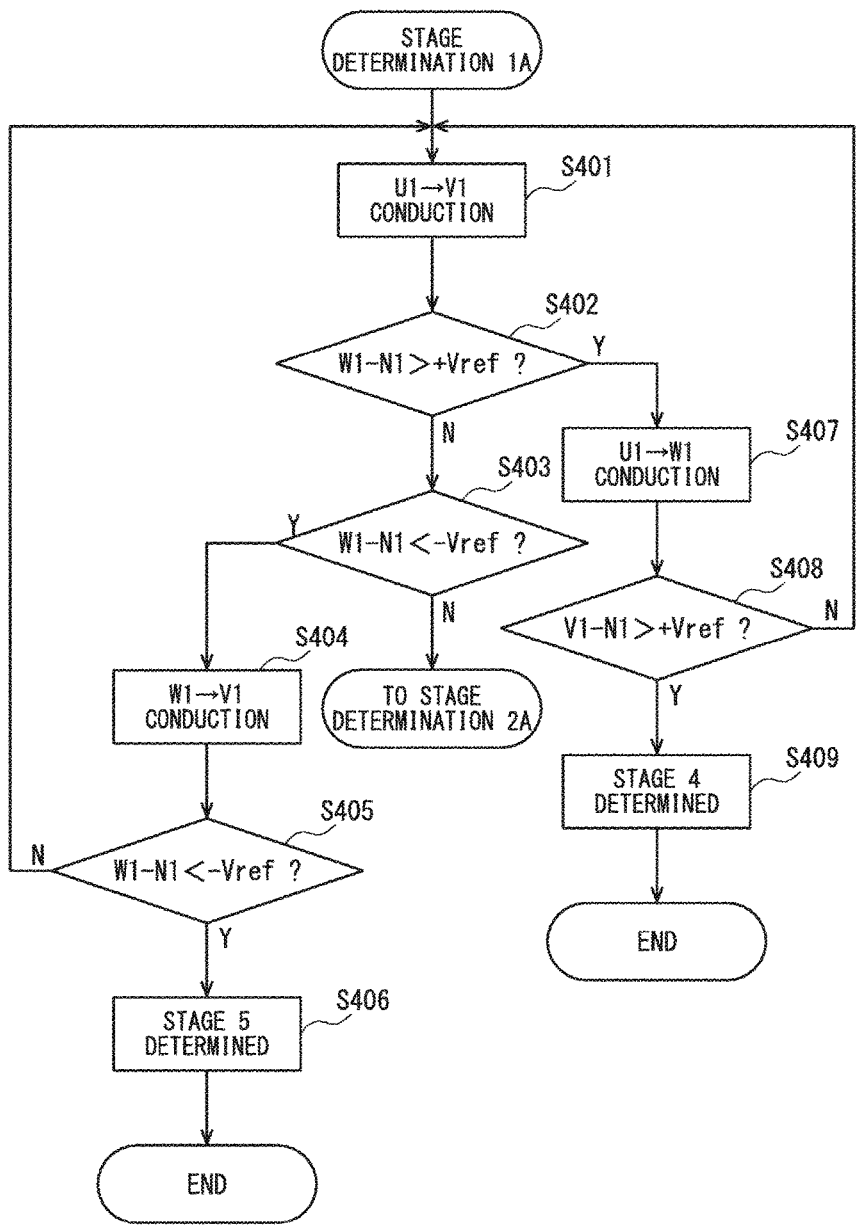
FIG. 26 is a flowchart for illustrating the stage determination process in the fourth embodiment.

Next, a flow of the stage discrimination process in step S12 of the fourth embodiment will be described with reference to FIGS. 26 to 28. In the stage determination process, the rotor position determination circuit 75c first performs conduction from U1 to V1 (step S401 in FIG. 26). Then, the rotor position determination circuit 75c compares the voltage W1−N1 measured at the time of the conduction from U1 to V1 with the positive reference voltage +Vref (step S402). If the voltage W1−N1 is +Vref or less (step S402: N), the rotor position determination circuit 75c compares the voltage W1−N1 with the negative reference voltage −Vref (step S403).

If the voltage W1–N1 is smaller than −Vref (step S403: Y), the rotor position determination circuit 75c performs conduction from W1 to V1 (step S404). Then, the rotor position determination circuit 75c compares the voltage W1–N1 measured at the time of the conduction from W1 to V1 with the negative reference voltage −Vref (step S405). If the voltage W1–N1 is smaller than −Vref (step S405: Y), the rotor position determination circuit 75c determines the positional relationship to be the stage 5 (step S406). On the other hand, if the voltage W1–N1 is −Vref or more (step S405: N), the rotor position determination circuit 75c again performs conduction from U1 to V1 (step S401).

In step S403, if the voltage W1–N1 is −Vref or more (step S403: N), the rotor position determination circuit 75c performs processing of the stage determination 2A shown in FIG. 27.

Additionally, in step S402, if the voltage W1–N1 is greater than +Vref (step S402: Y), the rotor position determination circuit 75c performs conduction from U1 to W1 (step S407). Then, the rotor position determination circuit 75c compares the voltage V1–N1 with the positive reference voltage +Vref (step S408). If the voltage V1–N1 is greater than +Vref (step S408: Y), the rotor position determination circuit 75c determines the positional relationship to be the stage 4 (step S409). On the other hand, if the voltage V1–N1 is +Vref or less (step S408: N), the rotor position determination circuit 75c again performs conduction from U1 to V1 (step S401).

Figure 27:
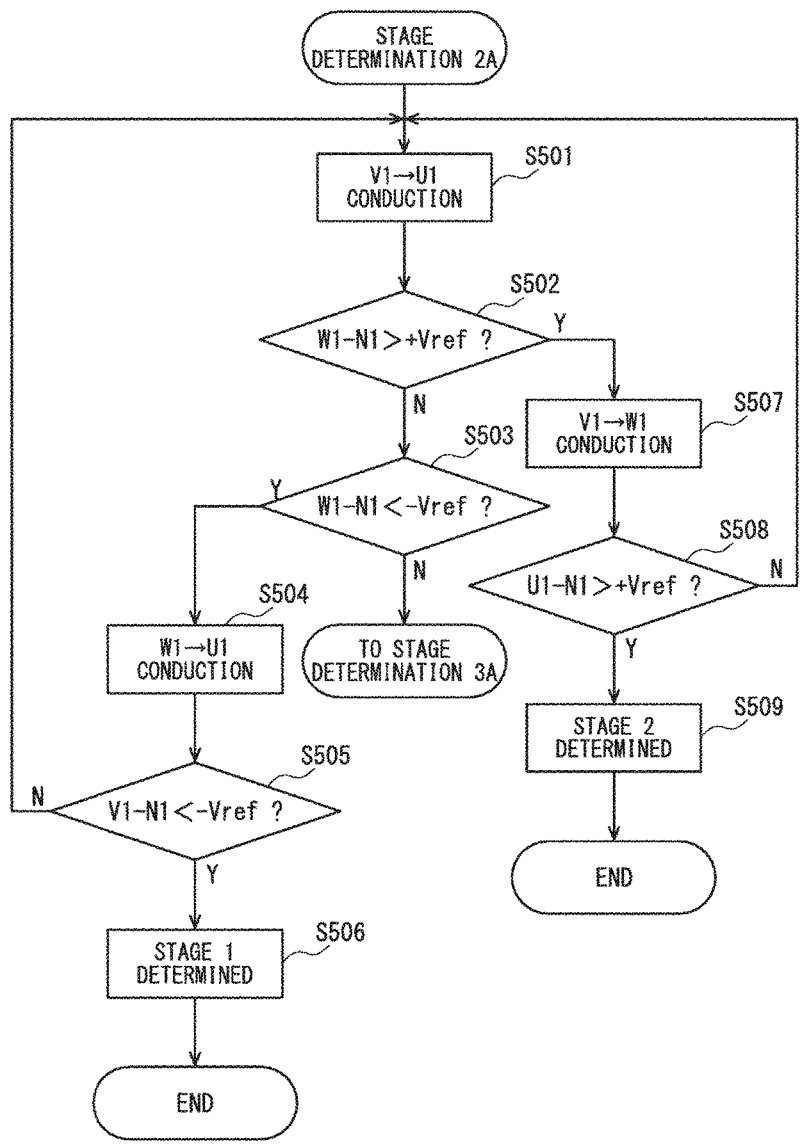
FIG. 27 is a flowchart for illustrating the stage determination process in the fourth embodiment.

On the other hand, in the stage determination 2A shown in FIG. 27, the rotor position determination circuit 75c first performs conduction from V1 to U1 (step S501). Then, the rotor position determination circuit 75c compares the voltage W1–N1 measured at the time of the conduction from V1 to U1 with the positive reference voltage +Vref (step S502). If the voltage W1–N1 is +Vref or less (step S502: N), the rotor position determination circuit 75c compares the voltage W1–N1 and the negative reference voltage −Vref (step S503).

If the voltage W1–N1 is smaller than −Vref (step S503: Y), the rotor position determination circuit 75c performs conduction from W1 to U1 (step S504). Then, the rotor position determination circuit 75c compares the voltage W1–N1 measured at the time of the conduction from W1 to U1 with the negative reference voltage −Vref (step S505). If the voltage W1–N1 is smaller than −Vref (step S505: Y), the rotor position determination circuit 75c determines the positional relationship to be the stage 1 (step S506). On the other hand, if the voltage W1–N1 is −Vref or more (step S505: N), the rotor position determination circuit 75c again performs conduction from V1 to U1 (step S501).

In step S503, if the voltage W1–N1 is −Vref or more (step S503: N), the rotor position determination circuit 75c performs processing of the stage determination 3A shown in FIG. 28.

Additionally, in step S502, if the voltage W1–N1 is greater than +Vref (step S502: Y), the rotor position determination circuit 75c performs conduction from V1 to W1 (step S507). Then, the rotor position determination circuit 75c compares the voltage U1–N1 with the positive reference voltage +Vref (step S508). If the voltage U1–N1 is greater than +Vref (step S508: Y), the rotor position determination circuit 75c determines the positional relationship to be the stage 2 (step S509). On the other hand, if the voltage U1–N1 is +Vref or less (step S508: N), the rotor position determination circuit 75c again performs conduction from V1 to U1 (step S501).

Figure 28:
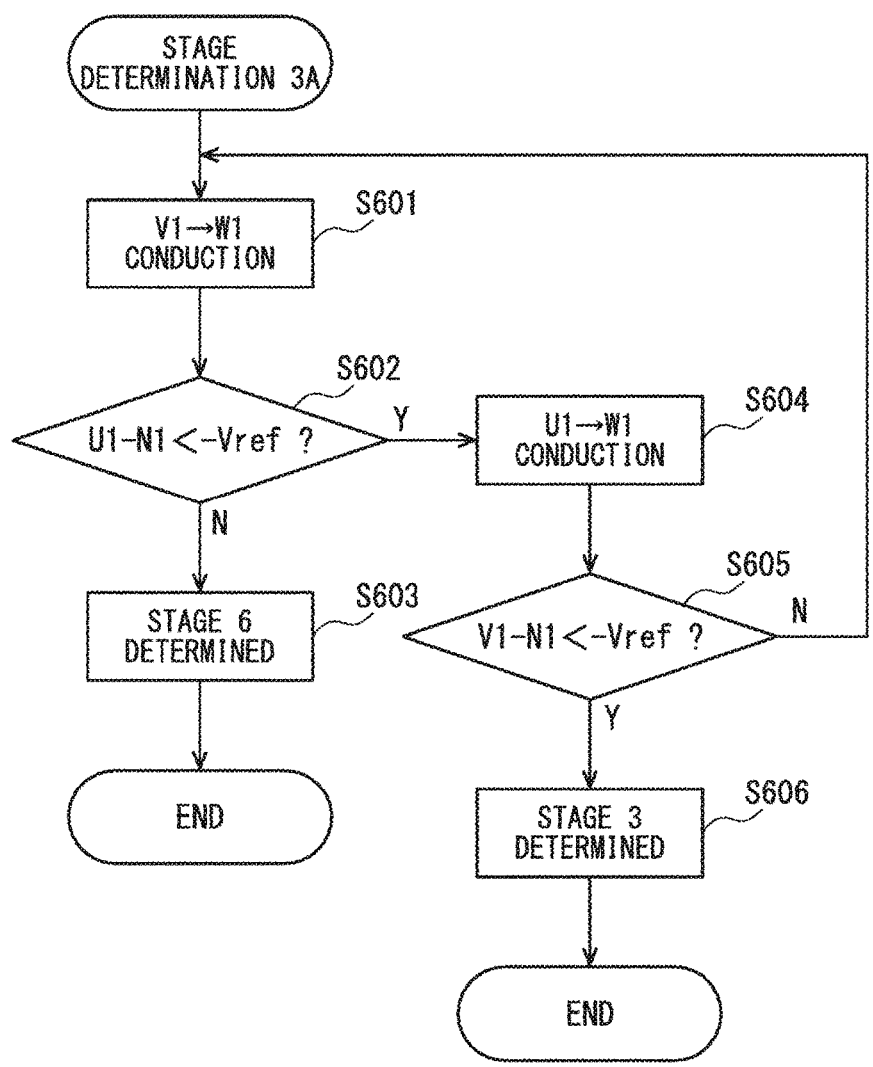
FIG. 28 is a flowchart for illustrating the stage determination process in the fourth embodiment.

Further, in the stage determination 3A shown in FIG. 28, the rotor position determination circuit 75c first performs conduction from V1 to W1 (step S601). Then, the rotor position determination circuit 75c compares the voltage U1–N1 measured at the time of the conduction from V1 to W1 with the negative reference voltage −Vref (step S602). If the voltage U1–N1 is −Vref or more (step S602: N), the rotor position determination circuit 75c determines the positional relationship to be the stage 6 (step S603).

If the voltage W1–N1 is smaller than −Vref (step S602: Y), the rotor position determination circuit 75c performs conduction from U1 to W1 (step S604). Then, the rotor position determination circuit 75c compares the voltage V1–N1 measured at the time of the conduction from U1 to W1 with the negative reference voltage −Vref (step S605). If the voltage V1–N1 is smaller than −Vref (step S605: Y), the rotor position determination circuit 75c determines the positional relationship to be the stage 3 (step S606). On the other hand, if the voltage V1–N1 is −Vref or more (step S605: N), the rotor position determination circuit 75c again performs conduction from V1 to W1 (step S601).

As described above, according to the starting power generation control apparatus 100c of the fourth embodiment, it is possible to, at the stop of the starter generator 1, determine the rotor stage using the information regarding the voltage (size, polarity) induced in the non-conducted winding U1, V1 or W1 when the winding U1, V1 or W1 is conducted according to the predetermined conduction pattern. Here, the rotor position determination circuit 75c may be modified as follows. In other words, when the winding U1, V1 or W1 is conducted according to a predetermined conduction pattern, the rotor position determination circuit 75c may measure a voltage generated in the winding U2, V2, or W2, as well as a voltage of the non-conducted winding U1, V1, or W1. In this case, the rotor position determination circuit 75c can perform the stage determination based on the voltage measurement result of the winding U1, V1, or W1 and the voltage measurement result of the winding U2, V2, or W2.

Figure 29:
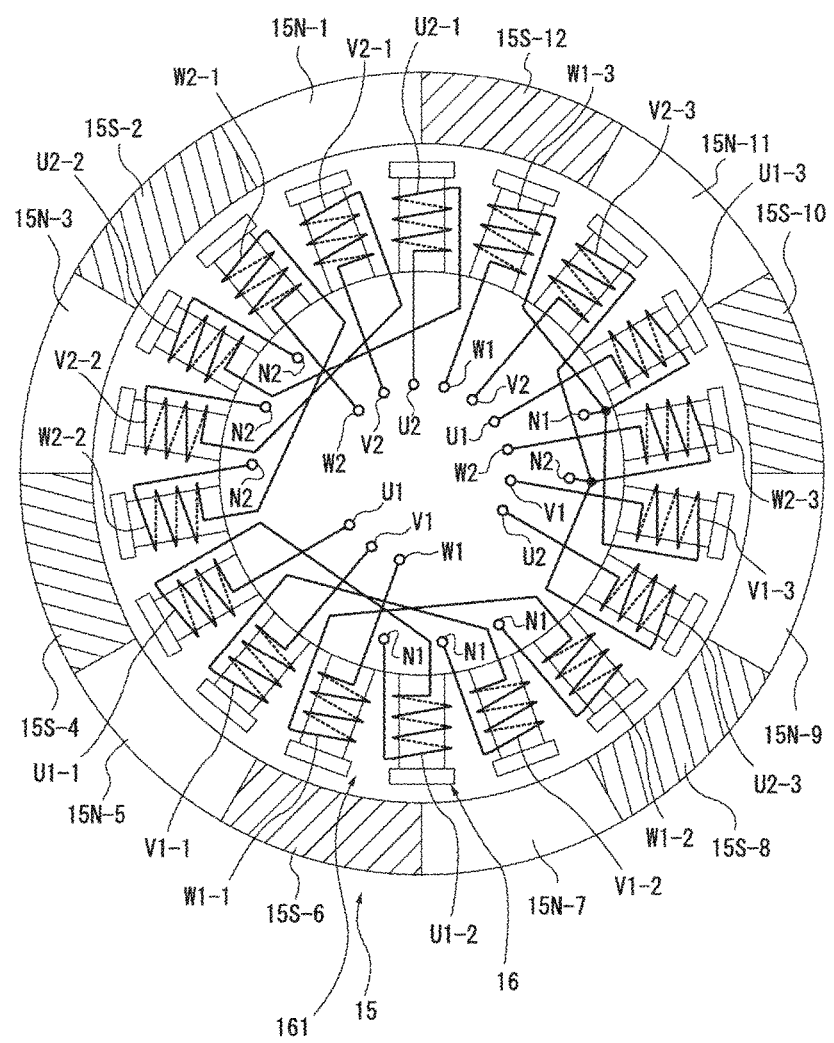
FIG. 29 is a schematic view showing a configuration example of a winding portion ACG1 and a winding portion ACG2.
Figure 30:
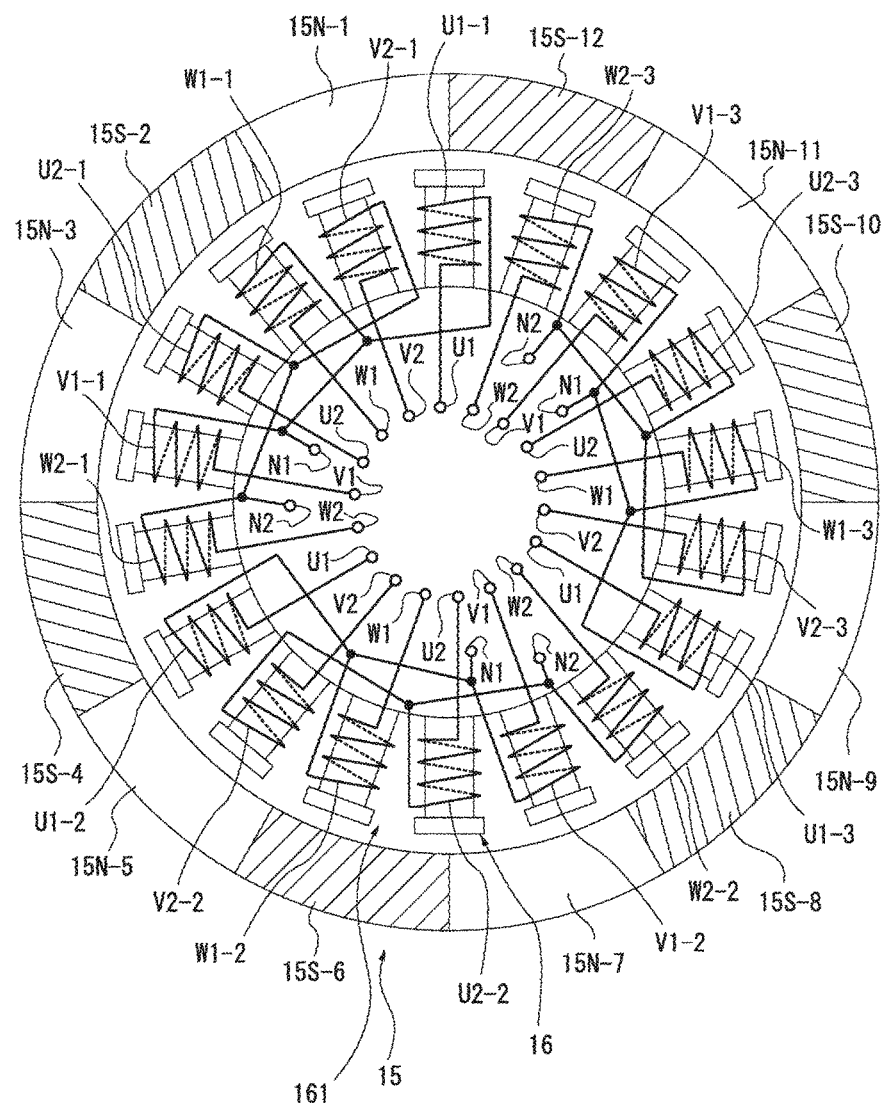
FIG. 30 is a schematic view showing a configuration example of the winding portion ACG1 and the winding portion ACG2.
Figure 31:
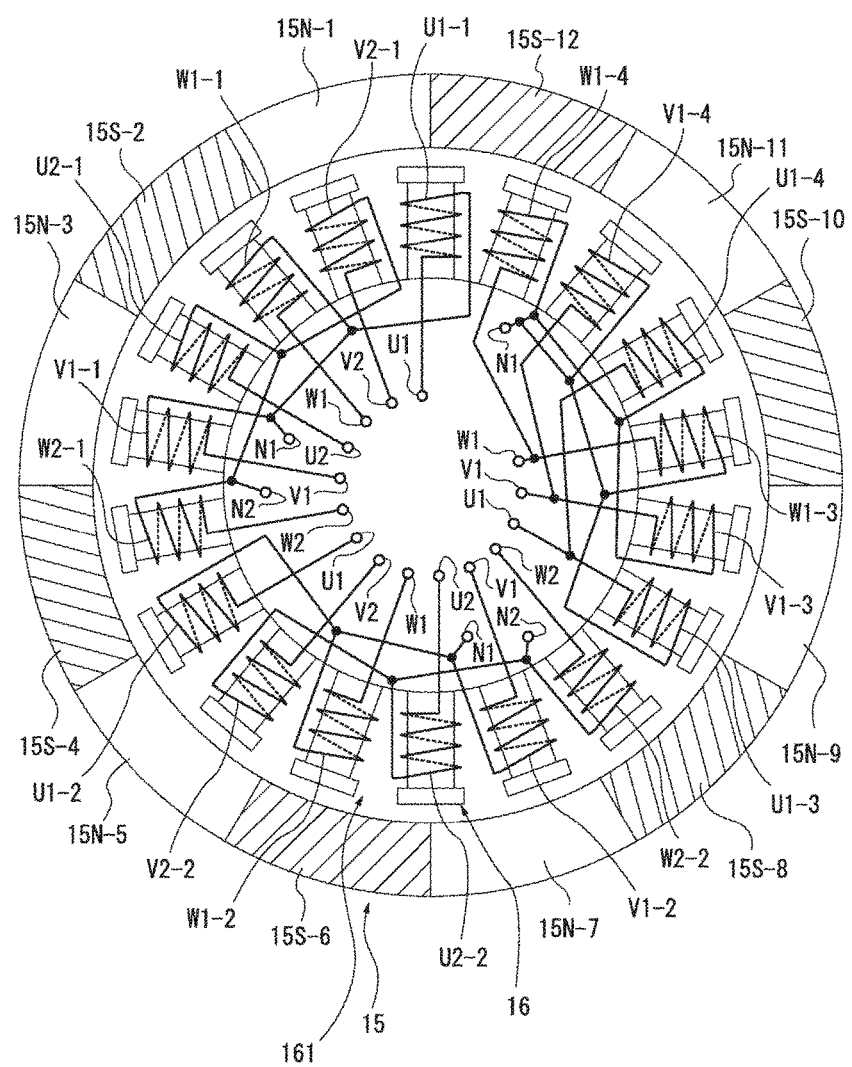
FIG. 31 is a schematic view showing a configuration example of the winding portion ACG1 and the winding portion ACG2.

Here, the configuration of the armature unit 161 is not limited to those shown in FIG. 5 or 20. Other configuration examples of the armature unit 161 are shown in FIGS. 29 to 31. Similar to FIGS. 5 and 20, FIGS. 29 to 31 are schematic views showing a configuration example of the field portion 15 of the starter generator 1 and the armature unit 161 including the armature core 16, the winding portion ACG1, and the winding portion ACG2.

Every successive six slots of the armature core 16 shown in FIG. 29 are wound respectively with alternately combined ones of: the windings U2-1 to U2-2, V2-1 to V2-2, and W2-1 to W2-2; the windings U1-1 to U1-2, V1-1 to V1-2, and W1-1 to W1-2; the windings U1-3, V1-3, and W1-3; and the windings U2-3, V2-3, and W2-3. Additionally, regarding the alternately combined ones of the windings U1-3, V1-3, and W1-3 and the windings U2-3, V2-3, and W2-3, one ends of the respective wirings are directly connected to make a wire connection with the neutral point N1 and a wire connection with the neutral point N2.

On the other hand, regarding the windings U2-1 to U2-2, the windings V2-1 to V2-2, and windings W2-1 to W2-2, the windings U2-1 and U2-2 are made of the same conductive wire; the windings V2-1 and V2-2 are made of the same conductive wire; and the windings W2-1 and W2-2 are made of the same conductive wire. Similarly, regarding the windings U1-1 to U1-2, the windings V1-1 to V1-2, and windings W1-1 to W1-2, the windings U1-1 and U1-2 are made of the same conductive wire; the windings V1-1 and V1-2 are made of the same conductive wire; and the windings W1-1 and W1-2 are made of the same conductive wire. Ends of the respective windings indicated by white circles are not connected to other windings. The ends of these windings are connected to, for example, a circuit board, so that they can be connected by wires in the circuit board.

A configuration example shown in FIG. 30 has the same arrangement of the respective wirings as that of the configuration example shown in FIG. 5. However, a wire connecting the neutral point N1 and a wire connecting the neutral point N2 are each divided into three. Additionally, ends of the respective windings indicated by white circles are configured to be connected by wires in the circuit board.

In a configuration example shown in FIG. 31, a winding U1 includes windings U1-1 to U1-4; a winding V1 includes windings V1-1 to V1-4; and a winding W1 includes wirings W1-1 to W1-4. Additionally, a winding U2 includes windings U2-1 to U2-2; a winding V2 includes windings V2-1 to V2-2; and a winding W2 includes windings W2-1 to W2-2. Further, the windings U1-1 to U1-2; the windings V1-1 to V1-2 and the windings W1-1 to W1-2; the winding U2-1 to U2-2, the windings V2-1 to V2-2, and the windings W2-1 to W2-2, are alternately arranged. Moreover, the windings U1-3 to U1-4, the windings V1-3 to V1-4, and the winding W1-3 to W1-4 are collectively arranged. A wire connecting the neutral point N1 is divided into two. Additionally, ends of the respective windings indicated by white circles are configured to be connected by the wires in the circuit board.

Figure 32:
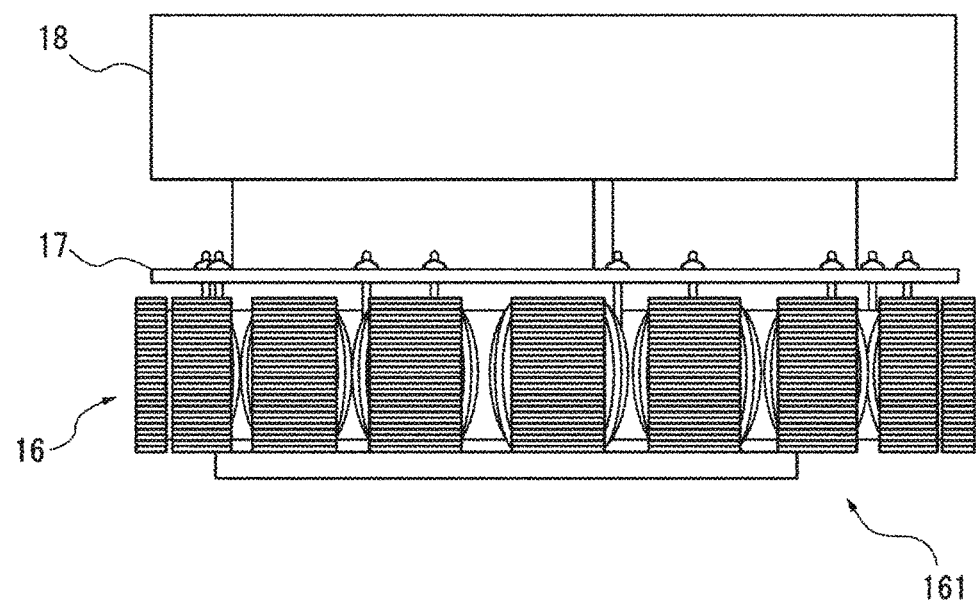
FIG. 32 is an assembly diagram for illustrating a configuration example of an armature unit.
Figure 33:
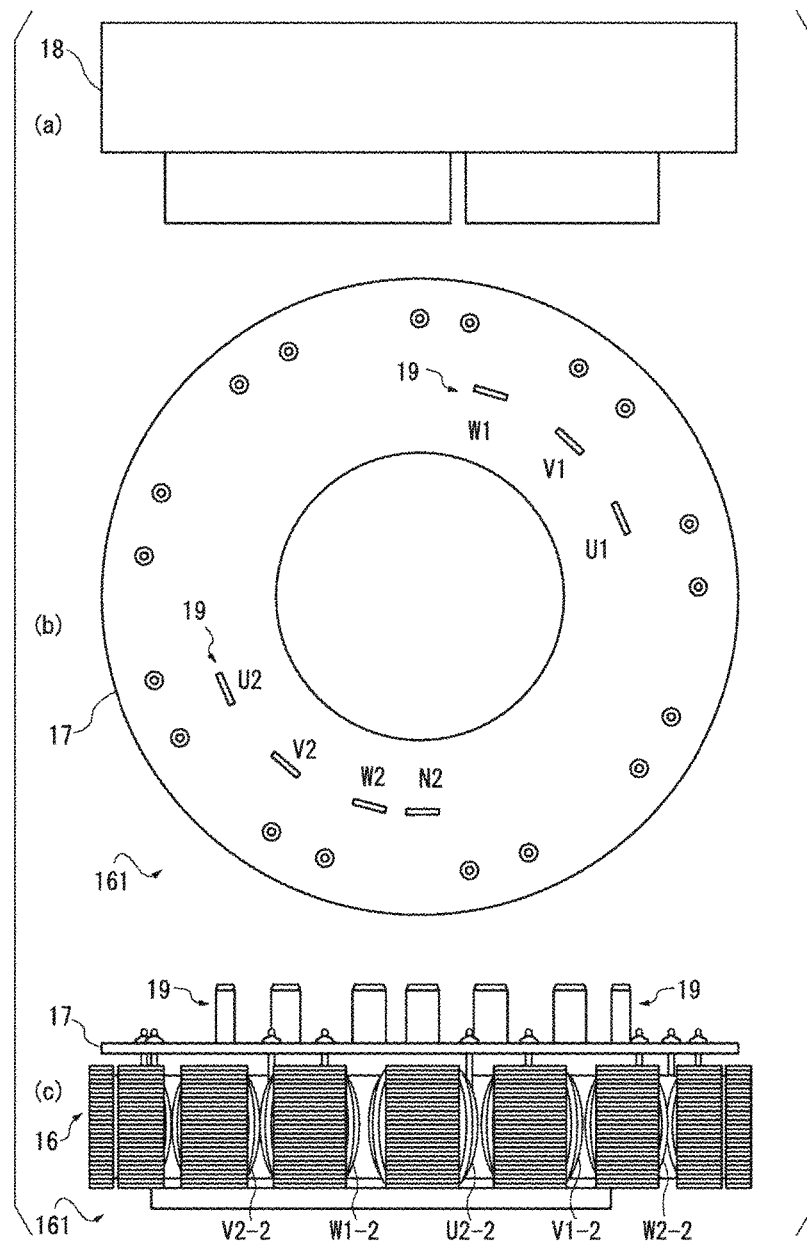
FIG. 33 is a component diagram for illustrating a configuration example of the armature unit.

Next, with reference to FIGS. 32 and 33, a configuration example in which the ends of the respective windings are wired with the circuit board. FIG. 32 is a side view showing a configuration example of the armature unit 161. In the configuration example shown in FIG. 32, the circuit board 17 is provided adjacent to the armature core 16. The ends of the windings wound around the armature unit 16, or the end of the conductive wire connecting the ends of the windings are connected by soldering to through holes of the circuit board 17. Additionally, a connector 18 is connected to the circuit board 17.

FIG. 33 shows a state where the connector 18 is detached from the armature unit 161 shown in FIG. 32. FIG. 33(a) is a side view of the connector 18. FIG. 33(b) is a plan view of the armature unit 161. Then, FIG. 33(c) is a side view of the armature unit 161. As shown in FIG. 33, the circuit board 17 is provided with a plurality of terminals 19 that are portions to be connected with the connector 18.

In the case where the ends of the respective windings are wired with the circuit board, it is possible to simplify the work of connecting the respective ends of the convoluted windings as shown in FIG. 5.

As described above, according to the respective embodiments of the present invention, in both the case where the starter generator 1 in which the winding portions ACG1 and ACG2 are arranged in parallel is used as a starter of the engine 2 and the case where the starter generator 1 is used as a power generator, the winding unit ACG2 is used as the detection winding for detecting the position of the rotor, thereby making it possible to detect the position of the rotor with high accuracy without providing a hall sensor. Therefore, it is not necessary to dispose an expensive hall sensor in correspondence with the high mounting accuracy, thereby making it possible to provide a starter generator that can perform rotor detection with high accuracy and at low cost.

Here, the embodiments of the present invention are not limited to the above, and also include design and the like within the scope not deviating from the gist of the invention.

DESCRIPTION OF REFERENCE NUMERALS 100, 100a, 100b, 100c: starting power generation control apparatus
1 starter generator
ACG1, ACG2 winding portion
61, 61b first power conversion unit
62, 62a second power conversion unit
7, 7a, 7b, 7c control unit
U1, V1, W1, U2, V2, W2 windings
72 CPU
73 detection and determination circuit
74 zero-cross detection circuit
75, 75c rotor position determination circuit
Q1 to Q14, Q17 to Q19 MOSFET

The invention claimed is:

1. A starting power generation apparatus comprising:
a starter generator including
a field portion having a permanent magnet, and
an armature unit including a first multi-phase winding and a second multi-phase winding which are arranged in parallel;
a first power conversion unit including a first positive-side DC terminal connected to a battery and a plurality of first AC terminals connected to the first multi-phase winding, the first power conversion unit being configured to convert a power bidirectionally between DC and AC;
a second power conversion unit including a plurality of second AC terminals connected to the second multi-phase winding, the second power conversion unit being configured to control a current to be input and output via the second AC terminals; and
a control unit configured to
detect a positional relationship between the field portion and the armature unit based on an output voltage of the second multi-phase winding, and
control the first power conversion unit and the second power conversion unit in accordance with the positional relationship detected,
wherein the control unit is configured to
when an engine is started, energize only one winding of the first multi-phase winding and the second multi-phase winding according to a plurality of conduction patterns, and compare voltages induced in an other winding of the first multi-phase winding and the second multi-phase winding among the plurality of conduction patterns, thereby detecting the positional relationship,
after energization is started, energize the first multi-phase winding and the second multi-phase winding until starting of the engine is completed, based on the positional relationship derived from a zero-cross point of the other winding, and
after the starting of the engine is completed, de-energize the other winding and detect the positional relationship from a zero-cross point of a no-load voltage to be generated at both ends of the other winding.

2. The starting power generation apparatus according to claim 1, wherein
the control unit is configured to measure an induced voltage to be generated in the second multi-phase winding when a predetermined current is conduced to the first multi-phase winding, thereby detecting the positional relationship when the starter generator is stopped.

3. The starting power generation apparatus according to claim 1, wherein
the control unit is configured to measure an induced voltage to be generated in the first multi-phase winding when a predetermined current is conduced to the first multi-phase winding, thereby detecting the positional relationship when the starter generator is stopped.

4. The starting power generation apparatus according to claim 1, wherein
the control unit is configured to, in a case that the starter generator is driven as a power generator, set a conduction angle of the second power conversion unit to less than 180° and detect a zero-cross point of the output voltage of the second multi-phase winding, thereby detecting the positional relationship between the field portion and the armature unit.

5. The starting power generation apparatus according to claim 1, wherein
the second power conversion unit includes a plurality of switching elements interposed between the first AC terminal and the second AC terminal.

6. The starting power generation apparatus according to claim 5, wherein
the second power conversion unit further includes a plurality of switching elements interposed between the plurality of the second AC terminals and a ground.

7. The starting power generation apparatus according to claim 1, wherein:
the first power conversion unit includes
a multi-phase bridge circuit configured to, between the first positive-side DC terminal and the plurality of the first AC terminals, convert a power bidirectionally between DC and AC, and
a first switching element interposed between the first positive-side DC terminal and the battery; and
the second power conversion unit includes
a second positive-side DC terminal connected to the battery,
a multi-phase bridge circuit configured to, between the second positive-side DC terminal and the plurality of the second AC terminals, convert a power bidirectionally between DC and AC, and
a second switching element interposed between the second positive-side DC terminal and the battery.

8. A starting power generation method for a starting power generation apparatus comprising:
a starter generator including
a field portion having a permanent magnet, and
an armature unit including a first multi-phase winding and a second multi-phase winding which are arranged in parallel;
a first power conversion unit including a first positive-side DC terminal connected to a battery and a plurality of first AC terminals connected to the first multi-phase winding, the first power conversion unit being configured to convert a power bidirectionally between DC and AC;
a second power conversion unit including a plurality of second AC terminals connected to the second multi-phase winding, the second power conversion unit being configured to control a current to be input and output via the second AC terminals; and
a control unit configured to
detect a positional relationship between the field portion and the armature unit based on an output voltage of the second multi-phase winding, and
control the first power conversion unit and the second power conversion unit in accordance with the detected positional relationship,
wherein the control unit is configured to
when an engine is started, energize only one winding of the first multi-phase winding and the second multi-phase winding according to a plurality of conduction patterns, and compare voltages induced in an other winding of the first multi-phase winding and the second multi-phase winding among the plurality of conduction patterns, thereby detecting the positional relationship,
after energization is started, energize the first multi-phase winding and the second multi-phase winding until starting of the engine is completed, based on the positional relationship derived from a zero-cross point of the other winding, and
after the starting of the engine is completed, de-energize the other winding and detect the positional relationship from a zero-cross point of a no-load voltage to be generated at both ends of the other winding.

* * * * *